(12) United States Patent
Tamura et al.

(10) Patent No.: US 10,554,829 B2
(45) Date of Patent: Feb. 4, 2020

(54) INFORMATION PROCESSING DEVICE, PHOTOGRAPHING DEVICE, IMAGE SHARING SYSTEM, AND METHOD OF INFORMATION PROCESSING

(71) Applicant: SONY CORPORATION, Tokyo (JP)

(72) Inventors: Shigefumi Tamura, Tokyo (JP); Ryosuke Nomura, Kanagawa (JP); Itaru Shimizu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 205 days.

(21) Appl. No.: 15/311,559

(22) PCT Filed: Apr. 22, 2015

(86) PCT No.: PCT/JP2015/062193
§ 371 (c)(1),
(2) Date: Nov. 16, 2016

(87) PCT Pub. No.: WO2015/186447
PCT Pub. Date: Dec. 10, 2015

(65) Prior Publication Data
US 2017/0126907 A1 May 4, 2017

(30) Foreign Application Priority Data
Jun. 3, 2014 (JP) ................................ 2014-114773

(51) Int. Cl.
*G06T 7/70* (2017.01)
*H04N 1/00* (2006.01)
(Continued)

(52) U.S. Cl.
CPC ........... *H04N 1/00244* (2013.01); *G06T 7/20* (2013.01); *G06T 7/70* (2017.01); *H04N 5/77* (2013.01)

(58) Field of Classification Search
CPC ....................................................... G06T 7/20
See application file for complete search history.

(56) References Cited

U.S. PATENT DOCUMENTS

2002/0176532 A1* 11/2002 McClelland ............ B64F 1/368
378/57
2003/0108240 A1* 6/2003 Gutta ...................... G06T 5/002
382/181
(Continued)

FOREIGN PATENT DOCUMENTS

JP 2008-160701 A 7/2008
JP 2009-017070 A 1/2009
(Continued)

*Primary Examiner* — Gandhi Thirugnanam
(74) *Attorney, Agent, or Firm* — Chip Law Group

(57) ABSTRACT

An information processing device capable of sharing photographed images while protecting the subject's privacy is provided. The information processing device includes: a photographing-related information acquisition unit configured to acquire image data obtained by photographing a subject or photographing information associated with the image data; a log data acquisition unit configured to acquire log data serving as information related to an operation of a predetermined moving object; and a processing unit configured to evaluate a relevance between the subject and the moving object based on the image data or the photographing information and based on the log data.

14 Claims, 17 Drawing Sheets

(51) Int. Cl.
*G06T 7/20* (2017.01)
*H04N 5/77* (2006.01)

(56) References Cited

U.S. PATENT DOCUMENTS

| | | | | |
|---|---|---|---|---|
| 2004/0202382 A1* | 10/2004 | Pilu | ................... | H04N 1/00167 |
| | | | | 382/276 |
| 2009/0015678 A1* | 1/2009 | Hoogs | ...................... | G06T 7/20 |
| | | | | 348/207.1 |
| 2009/0262987 A1* | 10/2009 | Ioffe | ................. | G06K 9/00281 |
| | | | | 382/118 |
| 2012/0233000 A1* | 9/2012 | Fisher | .................... | G06Q 30/02 |
| | | | | 705/14.71 |
| 2017/0126907 A1* | 5/2017 | Tamura | .................. | H04N 5/225 |
| 2018/0144186 A1* | 5/2018 | Wnuk | .................... | G06F 16/23 |

FOREIGN PATENT DOCUMENTS

| | | |
|---|---|---|
| JP | 2013-109384 A | 6/2013 |
| JP | 2014-042190 A | 3/2014 |
| JP | 2014-045259 A | 3/2014 |

\* cited by examiner

INFORMATION PROCESSING DEVICE, PHOTOGRAPHING DEVICE, IMAGE SHARING SYSTEM, AND METHOD OF INFORMATION PROCESSING

CROSS REFERENCE TO RELATED APPLICATIONS

This application is a U.S. National Phase of International Patent Application No. PCT/JP2015/062193 filed on Apr. 22, 2015, which claims priority benefit of Japanese Patent Application No. JP 2014-114773 filed in the Japan Patent Office on Jun. 3, 2014. The above-referenced applications is hereby incorporated herein by reference in its entirety.

TECHNICAL FIELD

The present disclosure relates to an information processing device, a photographing device, an image sharing system, a method of information processing, and a program.

BACKGROUND ART

With the recent increase in digital imaging devices and development of information network, the necessity for privacy protection measures is growing. As one example, it is possible for the user to photograph with ease using a mobile terminal equipped with a photographing function at any time and to allow a photographed image to be shared among a plurality of persons with ease by uploading it to a server. However, a subject that is not intended to be photographed may be included in the shared images.

In this regard, Patent Literature 1 discloses a technique, when a neighboring image capture device photographs a subject, allowing a face of the subject itself included in the captured image to be blurred by control at the side of the subject.

CITATION LIST

Patent Literature

Patent Literature 1: US Patent Publication No. 2004/0202382

SUMMARY OF INVENTION

Technical Problem

In Patent Literature 1, the user serving as a subject is necessary to have a module for transmitting a signal used to modify an image to an image capture device and the image can be modified only for the image capture device capable of receiving the signal from the module. However, not all of the image capture devices are necessarily able to receive this signal, so it is not sufficient for privacy protection.

Therefore, the present disclosure provides a novel and improved information processing device, photographing device, image sharing system, method of information processing, and program, capable of sharing photographed images while protecting the subject's privacy.

Solution to Problem

According to the present disclosure, there is provided an information processing device including: a photographing-related information acquisition unit configured to acquire image data obtained by photographing a subject or photographing information associated with the image data; a log data acquisition unit configured to acquire log data serving as information related to an operation of a predetermined moving object; and a processing unit configured to evaluate a relevance between the subject and the moving object based on the image data or the photographing information and based on the log data.

According to the present disclosure, there is provided a photographing device including: an image capture unit; a photographing information acquisition unit configured to acquire photographing information associated with image data acquired by the image capture unit; and a communication unit configured to transmit at least one of the image data and the photographing information to an information processing device configured to evaluate a relevance between a subject included in the image data and a moving object from which log data serving as information relating to an operation is acquired.

According to the present disclosure, there is provided an image sharing system including: a log collection device configured to acquire log data serving as information on activity of a moving object and to transmit the log data to an information processing device configured to evaluate a relevance between a subject included in image data and the moving object; and a browsing device configured to transmit a request for browsing image data in which a moving object serving as a user itself or a possession of the user is included as a subject to the information processing device and to acquire requested image data. The browsing device acquires image data having a high relevance between the subject and the moving object from the information processing device.

According to the present disclosure, there is provided a method of information processing, the method including: acquiring image data obtained by photographing a subject or photographing information associated with the image data; acquiring log data serving as information related to an operation of a predetermined moving object; and evaluating a relevance between the subject and the moving object based on the image data or the photographing information and based on the log data.

According to the present disclosure, there is provided a program for causing a computer to function as an information processing device including: a photographing-related information acquisition unit configured to acquire image data obtained by photographing a subject or photographing information associated with the image data; a log data acquisition unit configured to acquire log data serving as information related to an operation of a predetermined moving object; and a processing unit configured to evaluate a relevance between the subject and the moving object based on the image data or the photographing information and based on the log data.

According to the present disclosure as described above, it is possible for a person to specify image data in which the person is included as a subject from among image data photographed by other persons.

Advantageous Effects of Invention

According to the present disclosure described above, there is provided an image management device, photographing device, and image sharing system, capable of sharing photographed images while protecting the subject's privacy. Note that the effects described above are not necessarily limitative. With or in the place of the above effects, there

DESCRIPTION OF EMBODIMENT(S)

Figure 1:
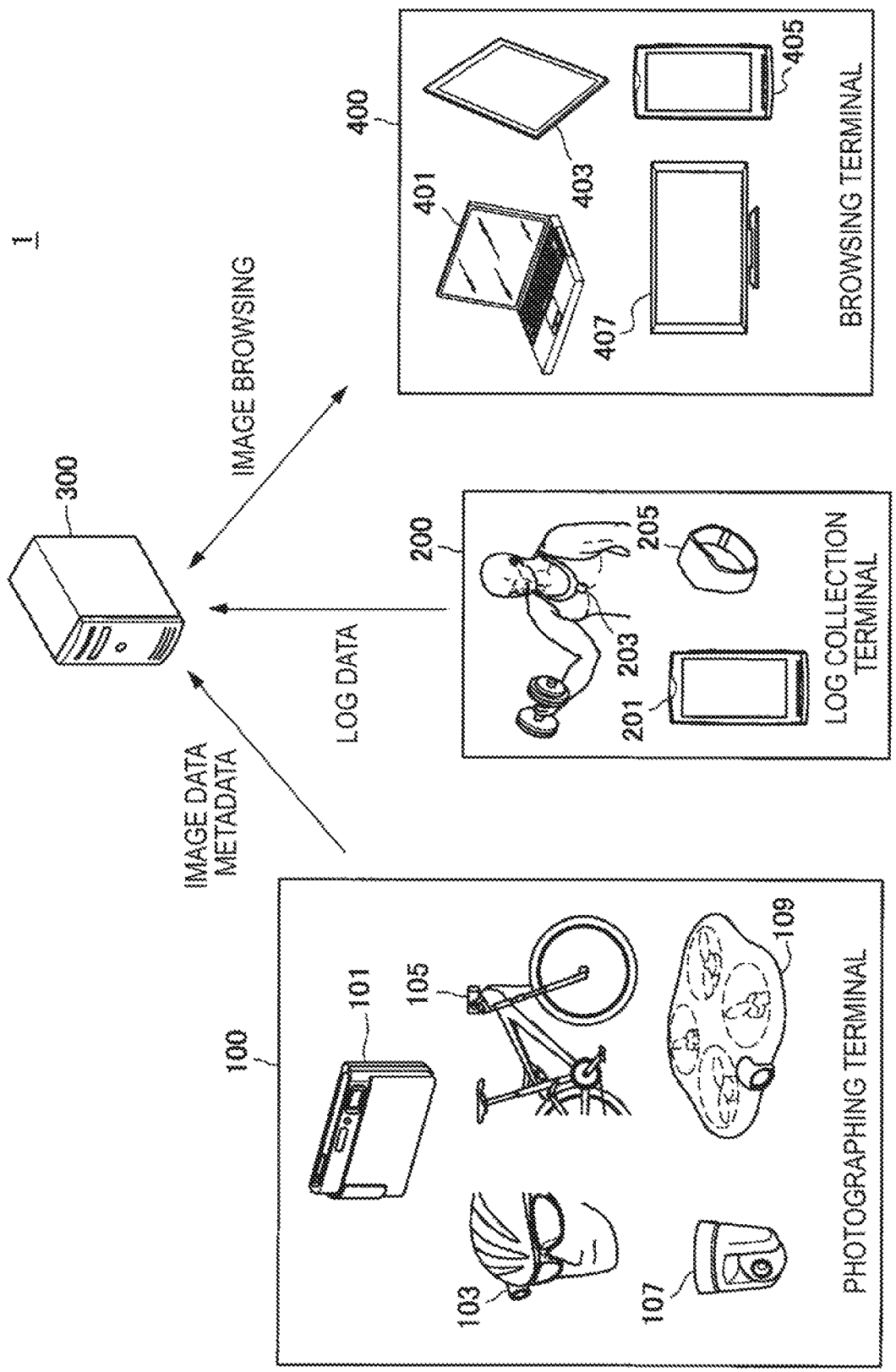
FIG. 1 is a diagram illustrated to describe a schematic configuration of an image sharing system according to one embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will be given in the following order.
1. Overview
2. System configuration
2.1. Photographing terminal
(1) Functional configuration
(2) Photographing mode notification function
(a. Notification through indicator or display)
(b. Notification of photographing mode during photographing of still image)
(c. Notification of subsequent or previous photographing mode)
2.2. Log collection terminal
2.3. Image management server
2.4. Browsing terminal
3. Processing Procedure
3.1. Process during photographing by photographing terminal
(1) Image data acquisition process
(2) Photographing mode notification process (photographer side)
(3) Photographing mode notification process (subject side)
3.2. Log data generation process by log collection terminal
3.3. Subject specifying process by image management server
3.4. Process of providing image for browsing terminal
4. Conclusion
5. Modification
6. Hardware configuration example

1. Overview

A schematic configuration of an image sharing system 1 according to one embodiment of the present disclosure will be described with reference to FIG. 1. FIG. 1 is a diagram illustrated to describe a schematic configuration of the image sharing system 1 according to the present embodiment.

The image sharing system 1 according to the present embodiment is a system to provide an image photographed by a photographer for the user other than the photographer. As illustrated in FIG. 1, the image sharing system 1 is configured to include a photographing terminal 100, a log collection terminal 200, an image management server 300, and a browsing terminal 400, as one example. The photographing terminal 100, the log collection terminal 200, and the browsing terminal 400 are communicable with the image management server 300 via a network.

The photographing terminal 100 is provided with an image capture unit (by reference numeral 110 in FIG. 2) and is a terminal that is capable of photographing an image. An example of the photographing terminal 100 includes a digital camera 101, a wearable camera 103 that is worn by the user, and a vehicle-mounted camera 105 that is mounted on a vehicle such as a bike or automobile to photograph an image of the outside of the vehicle. Alternatively, a stationary camera 107 such as monitoring camera, an aerial vehicle (drone) 109 or robot equipped with a photographing function, a smartphone, or the like may be used as the photographing terminal 100. The image data acquired by the photographing terminal 100 may be a still or moving image. The audio data may be acquired through a microphone or the like together with an image. Such image data acquired by the photographing terminal 100 is transmitted to the image management server 300 together with metadata such as photographing location and time.

The log collection terminal 200 is a terminal used to collect information on activity of a moving object. In the present disclosure, the moving object refers to a moving object, such as an animal, for example a pet, or robot, as well as human beings. The log collection terminal 200 collects the information on activity of a moving object, and so is provided with an information acquisition function, such as an acceleration sensor, GPS, imaging device, and gyro sensor. An example of such log collection terminal 200 may include an information communication terminal 201 such as a smartphone, pendant or wristband type wearable devices 203 and 205, or the like, as illustrated in FIG. 1. The information detected by the log collection terminal 200 is transmitted to the image management server 300.

The image management server 300 is a server that manages image data photographed by the photographing terminal 100 and provides the image data in response to a browsing request. The image management server 300 acquires information on activity of the user from the log collection terminal 200 to discriminate image data to be presented in response to the browsing request. The image management server 300 analyzes information on activity of a moving object, evaluates the relevance between it and a subject included in the image data, and specifies image data in which a moving object serving as the user or the user's possession is photographed as a subject. The image management server 300, when receiving a request for browsing an image in which the user itself or the user's possession is photographed as a subject from the browsing terminal 400, presents image data in which the user or the user's possession is photographed as a subject.

The browsing terminal 400 is a terminal that is used to browse the image data managed by the image management server 300. As an example of the browsing terminal 400, it is possible to use a device equipped with an image display function, such as a personal computer 401, an information communication terminal including a tablet terminal 403 and a smartphone 405, and a television 407, as illustrated in FIG. 1.

The photographing terminal 100, the log collection terminal 200, and the browsing terminal 400 may be the same terminal or may be different terminals.

In this way, in the image management server 300, the image data photographed by a photographer using the photographing terminal 100 is uploaded to the image management server 300 and is transmitted from the image management server 300 to the browsing terminal 400 in response to the browsing request from the browsing terminal 400. In this case, the image management server 300, when receiving a request for browsing an image in which the user itself or the user's possession is photographed, presents image data in which the user or the user's possession is photographed as a subject. In other words, it is possible for the user to receive the image data of the user that is photographed by another person, and to prevent an image of the user photographed against the user's intention from being published to other persons. The image sharing system 1 will be described in more detail.

2. System Configuration

Figure 2:
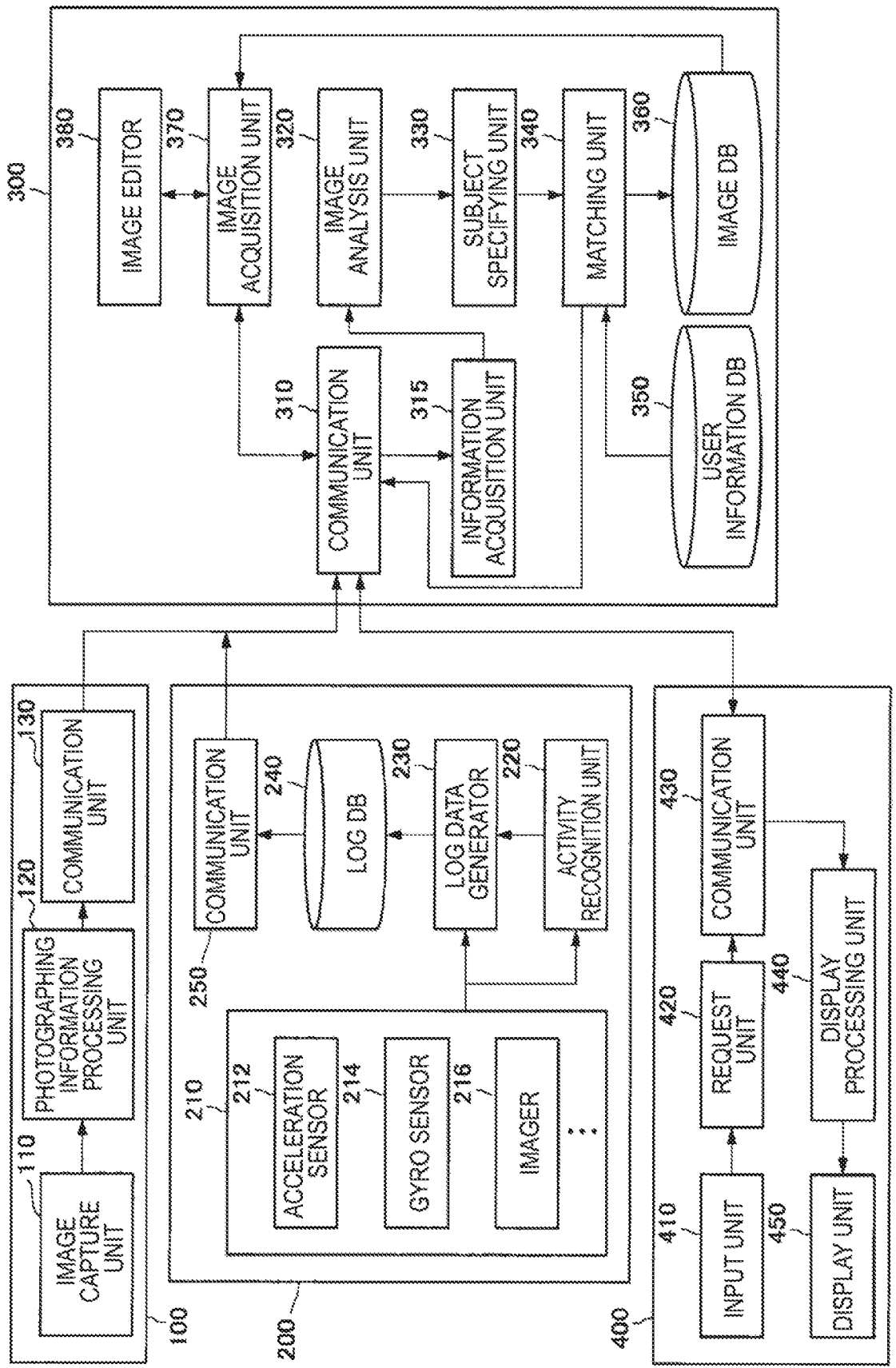
FIG. 2 is a functional block diagram illustrating one exemplary configuration of the image sharing system according to the present embodiment.

FIG. 2 illustrates one exemplary configuration of the image sharing system 1 according to the present embodiment. FIG. 2 illustrates functional units that are associated with the image sharing system 1, but the photographing terminal 100, the log collection terminal 200, the image management server 300, and the browsing terminal 400 may be provided with other functional units not illustrated.

[2.1. Photographing Terminal]
(1) Functional Configuration

The photographing terminal 100 is a device used to photograph a subject to acquire a still or moving image, and is configured to include an image capture unit 110, a photographing information processing unit 120, and a communication unit 130. As described above, a digital camera or wearable camera, a vehicle-mounted camera, a stationary camera, an aerial device (drone) or robot equipped with a photographing function, a smartphone, or the like can be used as the photographing terminal 100.

The image capture unit 110 is composed of an image sensor, a lens, or the like. An example of the image sensor may include a charge-coupled device (CCD) image sensor and a complementary metal-oxide-semiconductor (CMOS) image sensor. The image data acquired by the image sensor through a lens is outputted to the photographing information processing unit 120.

Figure 3:
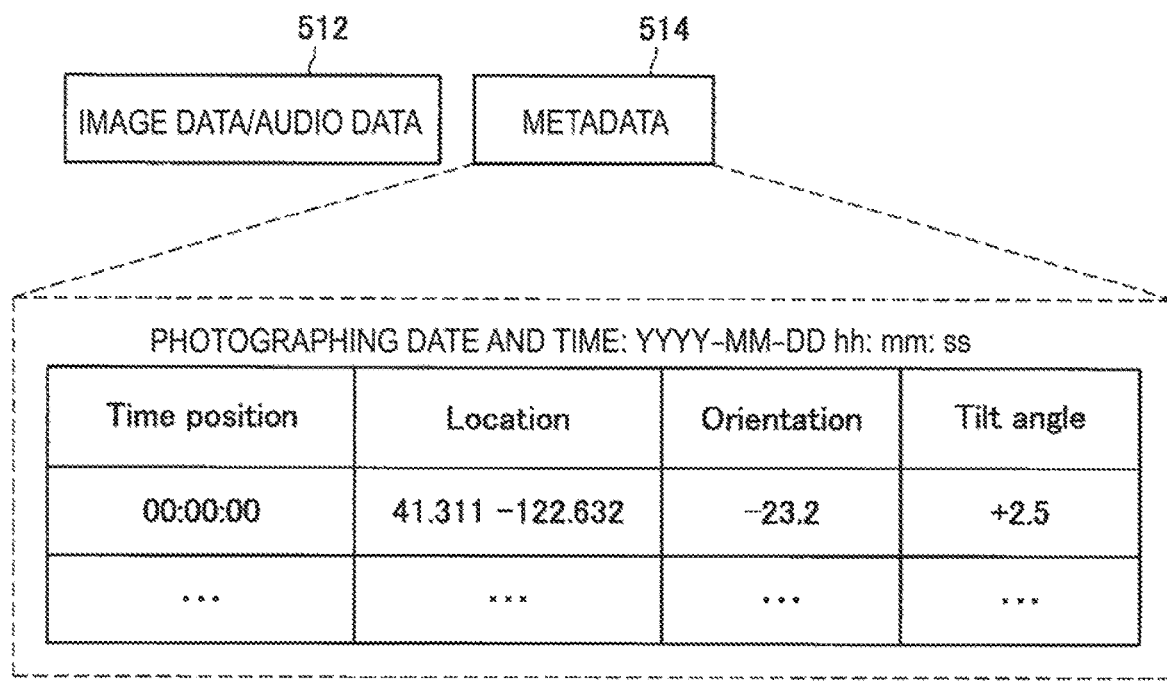
FIG. 3 is a diagram illustrated to describe an example of metadata added to image data.

The photographing information processing unit 120 adds metadata, which includes photographing information such as photographing location or photographing time in acquiring image data, to the image data acquired by the image capture unit 110. FIG. 3 illustrates an example of metadata. In FIG. 3, metadata 514 is added to image data 512 acquired together with audio data. An example of information contained in the metadata 514 includes photographing date and time or photographing location information. When the image data 512 is a moving image, the metadata 514 may contain a time position of the image data and a plurality of pieces of location information at the time position. Furthermore, the metadata 514 may contain information such as orientation, tilt angle, and height. The photographing information processing unit 120 adds such metadata 514 to the image data 512 and outputs it to the communication unit 130.

The communication unit 130 is a functional unit that is used to transmit and receive information to and from a terminal or server connected thereto via a network. The communication unit 130 of the photographing terminal 100 transmits the image data and metadata inputted from the photographing information processing unit 120 to the image management server 300.

(2) Photographing Mode Notification Function

The photographing terminal 100 according to the present embodiment may have a hardware configuration to notify photographer's surroundings about the function state of the image capture unit 110 (referred to as "photographing mode" hereinafter) from the viewpoint of privacy protection for the user serving as a subject. A description will be given of a wearable terminal as one example of the photographing terminal 100, but other camera devices that typically use a sensor, such as a pendant or wristband type wearable terminal, may be configured from the similar viewpoint.

(a. Notification Through Indicator or Display)

An exemplary configuration of a wearable camera as one example of the photographing terminal 100 is illustrated in FIGS. 4 to 8. The wearable camera illustrated in FIGS. 4 to 8 is an eyewear terminal 10, and is composed of a front portion 12 that is provided with a display unit positioned in front of the user's eye when being worn and supports 14R and 14L provided on the left and right sides respectively of the front portion 12. The supports 14R and 14L are positioned on the head side and the front portion 12 is fixed to the nose, allowing the user to wear the eyewear terminal 10.

The display unit displays various types of information through a display unit for projecting a video (not shown). The display unit according to the present embodiment is an optical transmission-type display panel as one example and thus it does not block the field of view from the outside, allowing the user to view naturally the outside and the content displayed on the display unit. The display mode of the display unit is not limited to the optical transmission type, but may be a video transmission type in which the outside state is photographed and is projected onto the display unit.

The eyewear terminal 10 according to the present embodiment is provided with a camera 15 used to photograph the outside and an indicator 16 used to indicate the photographing mode, and the camera 15 and the indicator 16 are provided on the display unit, as one example. The camera 15 is a camera that photographs the outside. The eyewear terminal 10 allows the user to take a photograph by operating the camera 15 through the line of sight, voice, or the like, and allows the user to photograph continuously the outside being viewed by the user in the state where the camera 15 is photographing. In such continuous photographing, the user who does not want to be photographed is more likely to be photographed, and so it is necessary to consider the privacy of the user to be photographed.

Thus, the eyewear terminal 10 may notify the subject side about the photographer's intention to acquire the image data by changing the indicator 16 depending on the function state of the camera 15. A camera mode in which the camera 15 is caused to be operated for image recording and a photographing mode for other purposes (e.g., for sensing purpose) are set as the photographing mode.

As one example, three modes of a camera off mode (first mode) that is a power saving state, a sensor mode (second mode) in which the photographer is not allowed to browse an image and the camera 15 is operated for sensing purpose, and a camera mode (third mode) may be set as the photographing mode. Alternatively, a camera off mode (first mode), a non-browsable mode (second mode) in which an image that is prevented from being browsed freely by the user other than the subject is photographed, and a browsable mode (third mode) in which an image that is allowed to be browsed freely by the user other than the subject is photographed may be set. In this case, a protection mode that is subjected to protection in which the photographed image is prevented from being browsed may be further set as an intermediate mode between the second mode and the third mode. The image photographed in the non-browsable mode may be an image used only for internal processing, like sensing purpose, and the image used for sensing purpose may be deleted after use.

The sensor mode is a mode that performs image acquisition for use in the image recognition as one example. More specifically, it is used when information (e.g., advertisements or coupons) on an object included in the angle of view of a camera is presented to recognize between a particular object and a general object, or when information on translation of text recognized from the image acquired by the camera 15 is presented. Alternatively, the presentation of information depending on a result obtained by individual recognition performed using feature amounts detected from the image, like the prevention of the name from being forgotten, and the use as a sensing for AR like SLAM are also considered. The sensor mode can also be used in other cases than the image recognition, for example, a case where it is used for environmental (amount of light) sensing to be used to adjust the brightness of a display.

In such a photographing mode, an example of the trigger for performing transition of release or shutter trigger from the second mode to the third mode includes a switching operation by the user, such as a button operation on a terminal or touch operation on a touch panel, gesture including a wink, line of sight, and voice. Alternatively, as a transition trigger between the second mode and the third mode, the recognition result by the camera 15 may be used. As one example, a case where a person's face is recognized by the camera 15 may be set as the third mode (camera mode) and a case where a person's face is not recognized may be set as the second mode (sensor mode). The switching between photographing modes may be determined based on location information detected by GPS or the like, attitude sensing information detected by acceleration sensor, gyro sensor, or the like, and biometric sensing information such as pulse rate, perspiration, body temperature, and brainwave.

Figure 4:
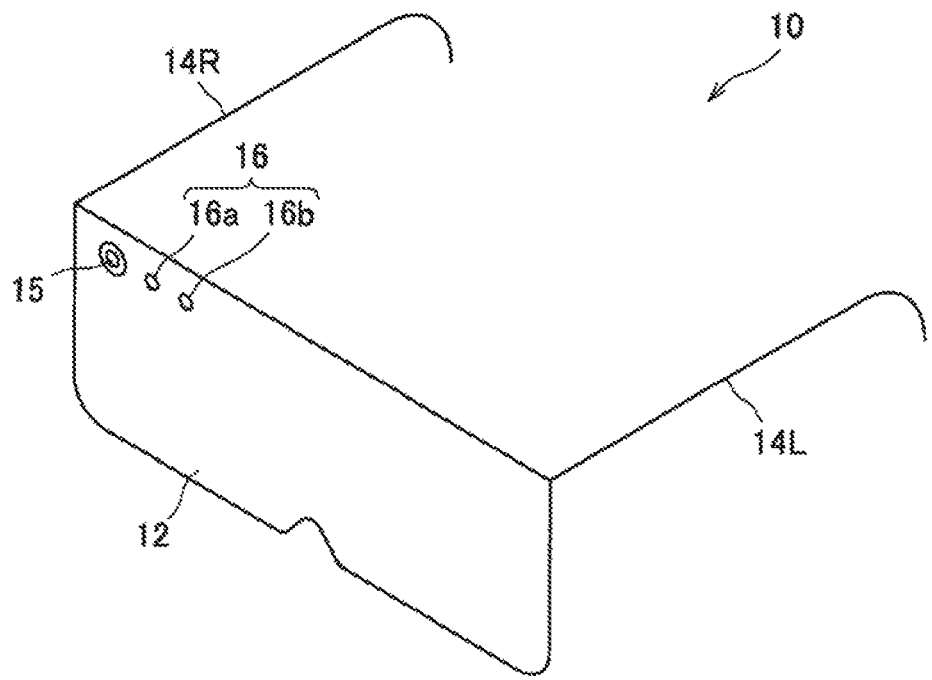
FIG. 4 is a diagram illustrated to describe an exemplary configuration of a wearable terminal provided with a camera and an indicator, as an example of a photographing terminal according to the present embodiment.

The indicator 16, which notifies the user serving as a subject about the photographing mode, is provided in the position at which a person around the photographer can recognize an indication on the indicator 16 as illustrated in FIG. 4, and for example, it is provided in the display unit installed on the front side of the photographer's face. The indicator 16 illustrated in FIG. 4 is configured to include a first indicator 16*a* and a second indicator 16*b*. The photographing mode of the camera 14 is displayed and is notified to a surrounding person, depending on the lighting state of each of the indicators 16*a* and 16*b*.

The notification by the indicator 16 may be performed, as one example, by light emission color, blinking pattern, or a combination thereof. As one example, when the three modes of camera mode, sensor mode, and camera off mode are set as the photographing mode as one example, no light emission is observed in the camera off mode, only the first indicator 16 is lighted up in the sensor mode, and only the second indicator 16*b* is lighted up in the camera mode. In this case, the first indicator 16*a* and the second indicator 16*b* can be made different in light emission color from each other, for example, blue-light emission for the first indicator 16*a* and red-light emission for the second indicator 16*b*, which allows a person around the photographer to recognize the photographing mode with ease.

Figure 5:
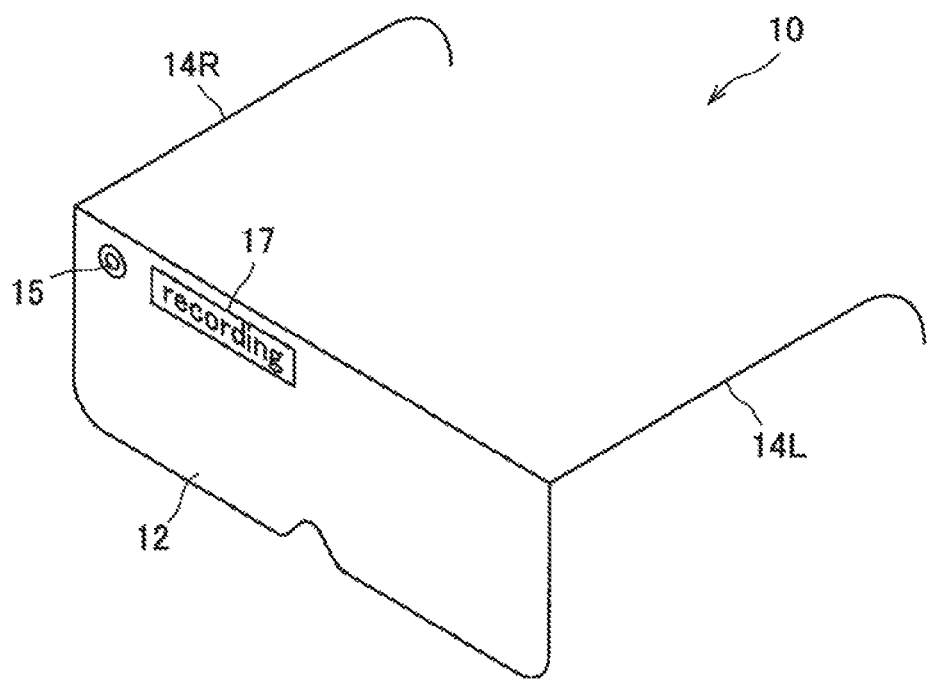
FIG. 5 is a diagram illustrated to describe an exemplary configuration of a wearable terminal provided with a camera and a display, as an example of the photographing terminal according to the present embodiment.

Alternatively, as illustrated in FIG. 5, a display 17 may be used as an indicator. The display 17 can be composed of a liquid crystal display or an organic EL display, as one example. The display 17 may display the photographing mode using text or symbol such as "sensing only" or "recording". Alternatively, an image that is being photographed by the camera 15 may be caused to be displayed on the display 17.

Figure 6:
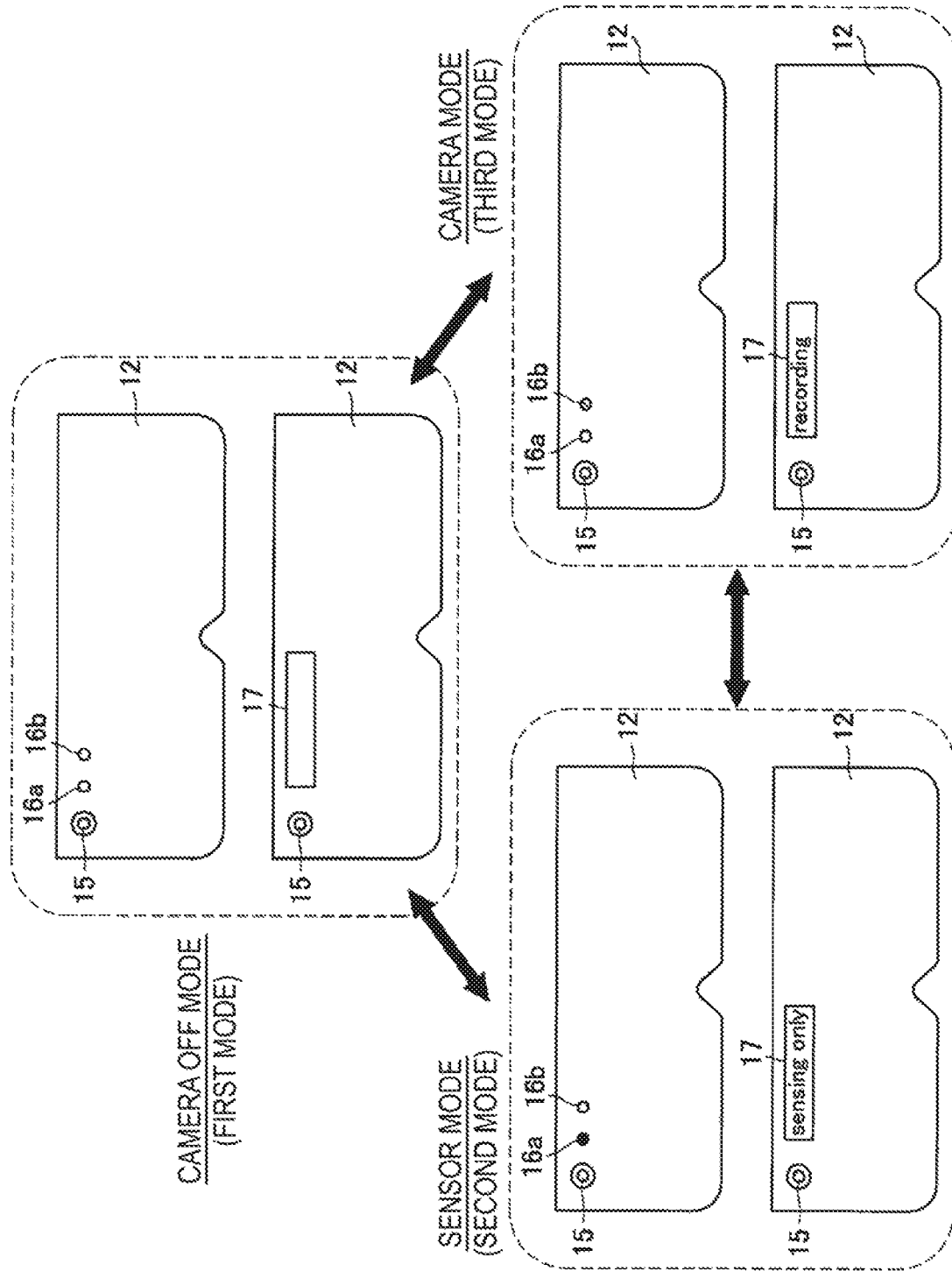
FIG. 6 is a diagram illustrated to describe an example of notification of a photographing mode using an indicator or a display.

As one example, a display example of the indicator 16 and the display 17 in the case where three modes of camera mode, sensor mode, and camera off mode are set as the photographing mode is illustrated in FIG. 6. As one example, when the camera 15 is in the camera off mode that is a power saving state, the function state of the camera 15 may be represented by causing none of the indicators 16*a* and 16*b* to be lighted up and by causing the display 17 to be in non-display state. As one example, in the case of the sensor mode in which the camera 15 is operated for sensing purpose only, the function state of the camera 15 may be represented by causing only the first indicator 16*a* to be lighted up or by causing the display 17 to display a text of "sensing only". As one example, in the case of the camera mode in which the camera 15 is operated for image recording, the function state of the camera 15 may be represented by causing only the second indicator 16b to be lighted up or by causing the display 17 to display a text of "recording".

As other indicators for notifying the photographing mode, a speaker that outputs sound depending on the photographing mode may be considered. The notification of the photographing mode is not limited to those that are perceptible to a person. As one example, the notification may be performed as a beacon signal using radio wave, sound wave, and light, and a device that receives the signal outputs an alert in response to the signal. The alert is represented through the lighting state of a lamp, content displayed on a display device, and vibration, as one example. Such notification of the photographing mode can be performed without interfering with the user's viewing, so it is more effective for use in a movie theater, art museum, or the like.

The eyewear terminal 10 may be configured to include a gyro sensor, a visual line sensor that detects the line of sight of the user wearing a terminal, a touch sensor, a microphone, a speaker, and a GPS, in addition to the display unit, the camera 15, the indicator 16, and the display 17.

(b. Notification of Photographing Mode During Photographing of Still Image)

In the display example of FIG. 6, when a moving image is photographed, the indicator 16 and the display 17 continue to display depending on the photographing mode for a predetermined time, allowing a person around the photographer to recognize the photographing mode of the photographing terminal 100 with ease. On the other hand, when a still image is photographed, the photographing mode is notified only during the photographing (exposure and then recording) in the camera mode or the sensor mode. In that case, the indicator 16 and the display 17 perform their displays in an instant, and so a person around the photographer is difficult to recognize the photographing mode of the photographing terminal 100. Thus, when a still image is photographed, the indicator 16 and the display 17 may continue to perform their displays for a predetermined time (e.g., a few minutes) even after the photographing.

Figure 7:
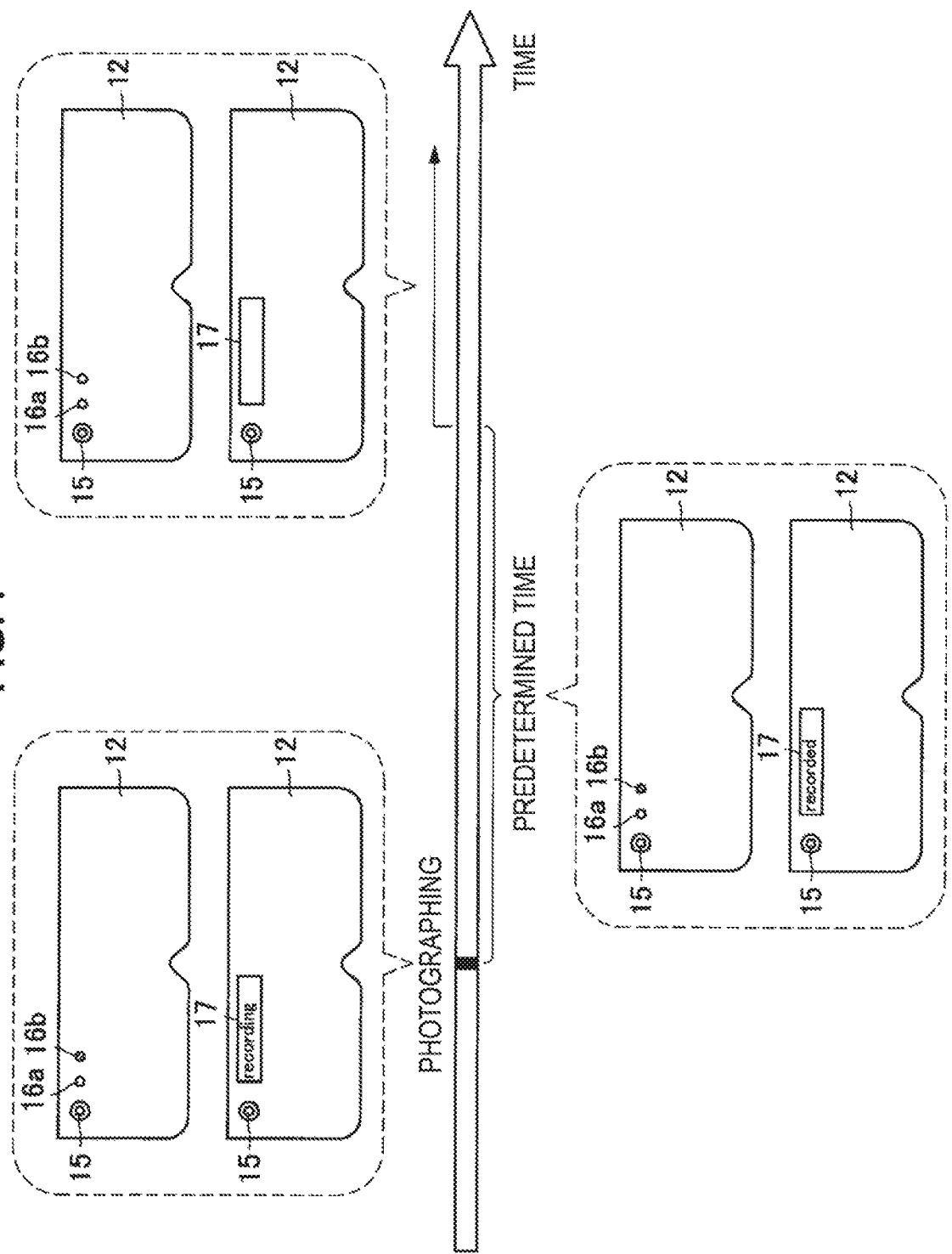
FIG. 7 is a diagram illustrated to describe an example of notification using an indicator or a display in a case where a still image is photographed in a camera mode.

FIG. 7 illustrates a display example of the indicator 16 and the display 17 when a still image is photographed. As illustrated in FIG. 7, when the camera 15 photographs a still image, the indicator 16 or the display 17 performs a display for the notification indicating that the photographing mode is the camera mode. As one example, only the second indicator 16b is lighted up, or a text of "recording" is displayed on the display 17.

Then, the photographing is completed actually in a short time and a transition from the camera mode to the camera off mode as one example is performed. However, during the elapse of a predetermined time from the time point when photographing is performed, the indicator 16 or the display 17 performs a display for the notification indicating that the photographing is performed. As one example, the second indicator 16b continues to be lighted up, or a display of the display 17 is changed from "recording" to "recorded" and then it is kept for a predetermined time. This makes it possible for a surrounding person to be notified that the photographing terminal 100 photographs most recently. After the elapse of a predetermined time from the time point when photographing is performed, the indicator 16 and the display 17 turn off their display and are in non-display state.

Such indication makes it possible for a person around the photographer to recognize the photographing mode of the camera 15 with ease even in photographing a still image.

(c. Notification of Subsequent or Previous Photographing Mode)

The indicator 16 and the display 17 of the photographing terminal 100 may show not only the current photographing mode but also a subsequent or previous photographing mode.

As one example, the photographing terminal 100 may perform previous notification for reporting in advance that the photographing terminal 100 is now in the camera mode. This previous notification makes it possible for surrounding persons to know previously that other persons browse an image of the surrounding persons serving as a subject. More specifically, when a trigger for transition from the camera off mode or the sensor mode to the camera mode is detected, a photographing notice mode that performs previous notification is set before setting the camera mode, and then the camera mode is set up. In the photographing notice mode, as one example, the second indicator 16b is lighted up, a sound indicating that the recording is ready to initiate is outputted, or a display indicating that it is in the notice mode is displayed on the display 17.

It is possible for a person receiving such previous notification to inform the photographer of the person's will of photographing rejection or photographing prohibition. As one example, in the photographing notice mode, when an input indicating the photographing rejection using voice or gesture is detected, the transition to the camera mode may be prohibited.

Such notification is applicable to a recording holding mode in which the photographing in the camera mode is held temporarily, in addition to the photographing notice mode that is the camera mode hereinafter. By the provision of the photographing notice mode, a desired shutter chance is likely to be missed. Thus, when a trigger for the transition from the camera off mode or the sensor mode to the camera mode is detected, the photographing is initiated, but its photographing mode may be the recording holding mode in which the determination of whether data of a photographed image is to be recorded in a memory or the like can be performed later. In this case, when there is an input indicative of the photographing rejection during the recording holding mode, the image data that is stored in a memory during the recording holding mode may be deleted without being recorded.

On the other hand, in the notification of a previous photographing mode, the photographing mode during a predetermined time (e.g., about 10 minutes) before the present time is notified. This makes it possible, even when a person around the photographer has missed the moment of the photographing, for the person to point out to the photographer that the photographing is performed in the camera mode from now.

Figure 8:
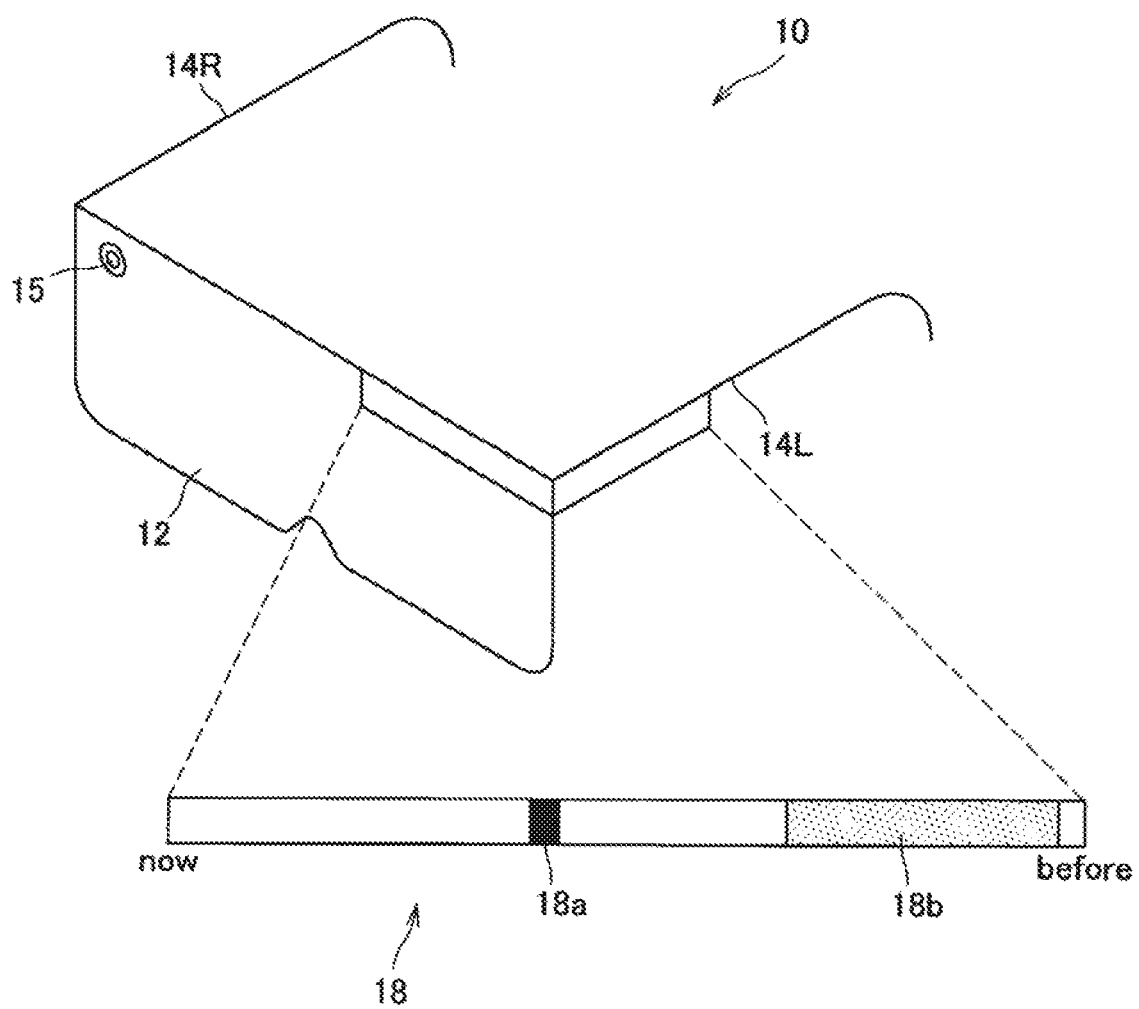
FIG. 8 is a diagram illustrated to describe one exemplary configuration of a wearable terminal provided with an indicator that indicates a previous photographing mode.

An example of a method of notification of a previous photographing mode includes a method of providing an indicator 18 in a portion of the eyewear terminal 10 and displaying a photographing mode along the time axis of the indicator 18, as illustrated in FIG. 8. The indicator 18 is provided in the position that can be visually recognized by a surrounding person. As one example, the indicator 18 of FIG. 8 is provided from the front portion 12 to the support 14L. The indicator 18 may be composed of a plurality of light-emitting elements arranged in a row, or may be a display device such as a liquid crystal display and an organic EL display.

By setting the longitudinal direction (direction from the front portion 12 to the support 14L including a bent portion in FIG. 8) of the indicator 18 to be the time axis direction, the predetermined time is represented between one side (e.g., an end on the side of the front portion 12) and the other side (e.g., an end on the side of the support 14L). As one example, the end on the side of the front portion 12 represents the present time, and the end on the side of the support 14L represents a time before the predetermined time. This indicator 18 displays a point of time at which the photographing is performed previously and a photographing mode at that time. Types of the photographing mode can be represented using a display of light emission color, light flashing state, text, or symbol.

As one example, the photographing of a still image in the camera mode is represented by a first display color, and the photographing of a moving image in the camera mode is represented by a second display color. The example illustrated in FIG. 8 shows that a still image is photographed at the position of an area 18a represented by the first display color (e.g., 5 minutes ago), and a still image is photographed at the section of an area 18b represented by the second display color (e.g., 7 to 9 minutes ago). This makes it possible, even when a person around the photographer has missed the moment of the photographing, for the person to recognize that the photographing is performed in the camera mode from now and for the person to point out it to the photographer.

[2.2. Log Collection Terminal]

Figure 9:
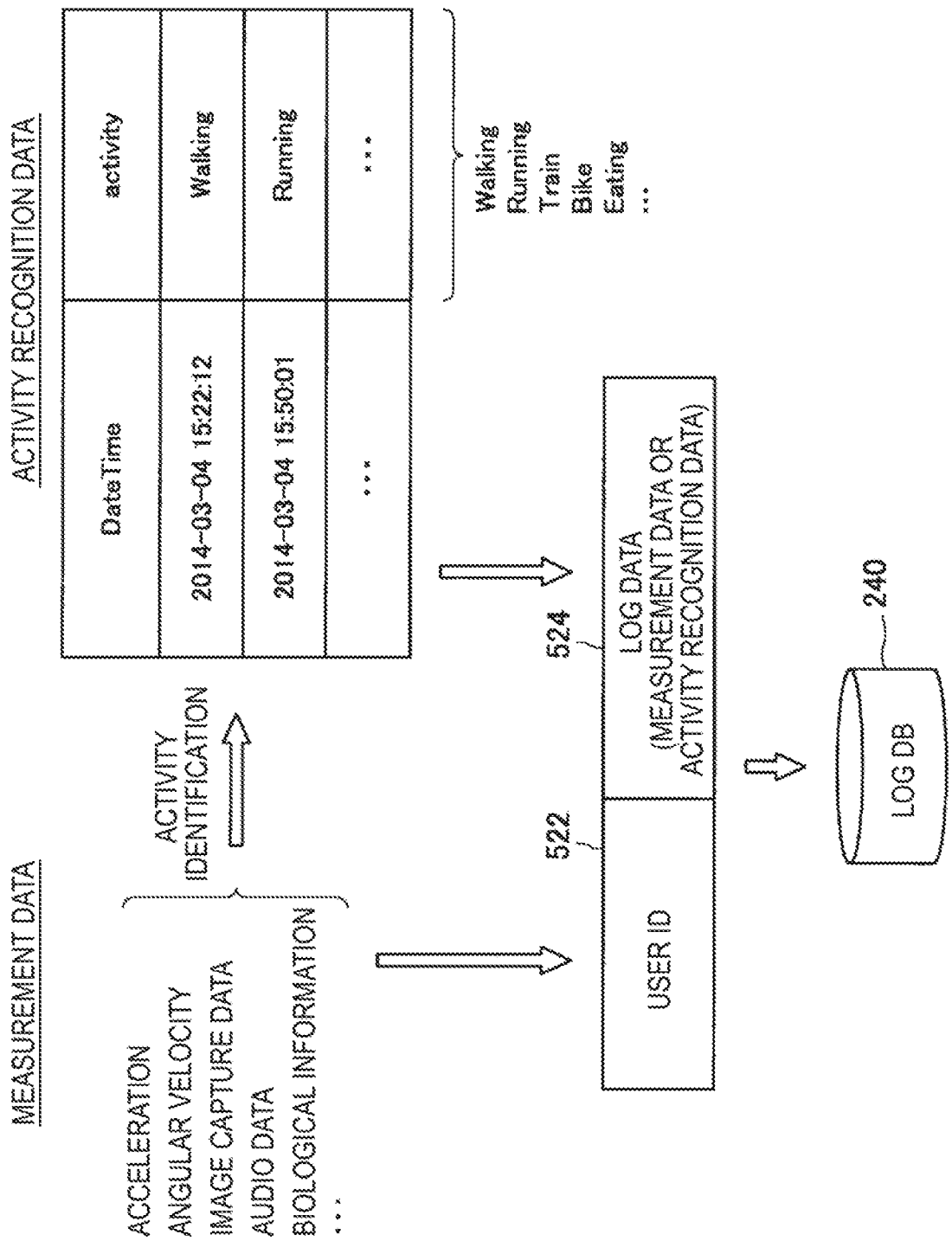
FIG. 9 is a diagram illustrated to describe the procedure of log data generation process in a log collection terminal according to the present embodiment.

Referring back to FIG. 2, the log collection terminal 200 will be described. The log collection terminal 200 is a terminal in which a moving object serving as the user who receives a service from the image sharing system 1 or the user's possession carries typically. The log collection terminal 200 acquires information including the position and motion of a moving object at any time and continues to record it in association with time information. The log collection terminal 200 is equipped with an authentication function, and uses the acquired information as information on activity of the authenticated moving object. The log collection terminal 200 is configured to include various sensors 210, an activity recognition unit 220, a log data generator 230, a log DB 240, and a communication unit 250, as illustrated in FIG. 2. FIG. 9 illustrates the procedure of log data generation process performed by the log collection terminal 200 according to the present embodiment.

The various sensors 210 are detectors used to acquire motion information on activity of a moving object. Examples of various sensors 210 include an acceleration sensor 212, a gyro sensor 214, an imager 216, and other like sensors, and the sensors 210 acquire measurement data such as acceleration, angular velocity, image capture data, audio data, and biological information. The measurement data acquired by such various sensors 210 varies depending on the position at which the log collection terminal 200 is disposed (worn), but the activity type of a moving object can be recognized from the acquired measurement data.

As one example, even when it is within a pocket or bag for measurement, or when it is worn on a moving object for measurement, the type of activity of a moving object that is walking, running, stopped, riding a bike, riding a train, or the like can be recognized. The measurement data that can be measured varies depending on the position at which the log collection terminal 200 is attached to a moving object. As one example, when a terminal is a type that is attached to the person's arm or leg, the movement of the hand and leg can be acquired. When a terminal is a type that is attached to the person's head, the movement of the head can be acquired. Furthermore, as the measurement data, voice of a moving object itself or external environment, a photographed image of a moving object itself or external environment, and various types of biological information may be acquired.

The measurement data acquired by the various sensors 210 is outputted to at least one of the activity recognition unit 220 and the log data generator 230.

The activity recognition unit 220 performs activity recognition of a moving object based on the measurement data acquired by the various sensors 210. The activity recognition unit 220 analyzes the activity of the moving object by the measurement data using the known activity recognition technique. An example of the analyzed activity of the moving object includes walking, running, riding a bike, riding a train, eating, and being stopped. The activity of the moving object analyzed by the activity recognition unit 220 is treated as activity recognition data and is outputted to the log data generator 230 together with the time at which the activity is performed.

The log data generator 230 is a functional unit that generates log data. The log data generator 230 associates the moving object, which carries the log collection terminal 200 and is authenticated by the log collection terminal 200, with a unique user ID 522 and log data 524, and records the result in the log DB 240. The log data 524 is information used to be capable of specifying the moving object's activity. As one example, the log data 524 may be raw data (measurement data) obtained by sensing in the various sensors 210, or may be activity recognition data that is recognized by the activity recognition unit 220.

The log DB 240 is a storage unit that stores the log data 524 associated with the user ID 522. The user ID 522 and the log data 524 stored in the log DB 240 are transmitted to the image management server 300 via the communication unit 250 at a predetermined timing.

The communication unit 250 is a functional unit that performs transmission and reception of information to and from a terminal or server connected thereto via a network. The communication unit 250 of the log collection terminal 200 transmits the user ID 522 and the log data 524 that are recorded in the log DB 240 to the image management server 300 at a predetermined timing. These types of data are transmitted to the image management server 300 at the timing, such as predetermined time interval, when communication with the image management server 300 is available, and the time at which the use of a service of the image management server 300 can be started.

In the log collection terminal 200 according to the present embodiment, the activity recognition process is performed in the log collection terminal 200 based on the measurement data acquired by the various sensors 210, but the present disclosure is not limited thereto. As one example, when the image management server 300 is equipped with an activity recognition process function, the measurement data is treated as log data and is transmitted to the image management server 300, and then the activity recognition process may be executed in the image management server 300. Alternatively, a device that relays between the log collection terminal 200 and the image management server 300 is equipped with the activity recognition process function, the measurement data is transmitted to the device that executes the activity recognition process on the data, and then the activity recognition data may be transmitted from the device to the image management server 300. An example of the device that relays between the log collection terminal 200 and the image management server 300 includes a smartphone.

[2.3. Image Management Server]

The image management server 300 specifies a subject included in the image data uploaded from the photographing terminal 100 and notifies the user who is the subject or the owner of the subject that there is image data as the subject. The image management server 300 is configured to include a communication unit 310, an information acquisition unit 315, an image analysis unit 320, a subject specifying unit 330, a matching unit 340, a user information DB 350, an image DB 360, an image acquisition unit 370, and an image editor 380, as illustrated in FIG. 2.

The communication unit 310 is a functional unit that is used to transmit and receive information to and from a terminal connected thereto via a network. The communication unit 310 of the image management server 300 receives the image data to which the metadata from the photographing terminal 100 is added or the log data with which the user ID from the log collection terminal 200 is associated, and outputs it to the information acquisition unit 315. The communication unit 310 receives a request from the browsing terminal 400 and provides the browsing terminal 400 with image data corresponding to the request.

The information acquisition unit 315 acquires information that is processed by a processing unit used to evaluate the relevance between the subject included in the image data and the moving object from which the log data is acquired. In other words, the information acquisition unit 315 functions as a photographing-related information acquisition unit and a log data acquisition unit. The information acquisition unit 315 acquires image data to which the metadata received from the communication unit 310 is added or log data with which the user ID from the log collection terminal 200 is associated, and outputs it to the image analysis unit 320.

The image analysis unit 320 specifies activity or behavior of the subject included in the image data uploaded from the photographing terminal 100, based on the image data and metadata. The image analysis unit 320 extracts a subject such as person, animal, and object included in the image data, and specifies the activity or behavior of the extracted subject based on the photographing time or location information included in the metadata. The image analysis unit 320 associates each of the extracted subjects with activity, behavior, and activity time and sets it as analysis data, and then outputs it to the subject specifying unit 330. The analysis data may be recorded in a storage unit (not shown).

The subject specifying unit 330 compares the analysis data with the log data transmitted from the log collection terminal 200, and evaluates the relevance between the subject and the moving object. For the log data including the time that is the same as the activity time of the analysis data or the log data including the time, the subject specifying unit 330 compares the activity or behavior of the analysis data with the measurement data or activity recognition data acquired as the log data, and evaluates the relevance between the subject included in the image data and the moving object. The subject specifying unit 330 determines how much the subject is associated with the moving object based on the evaluation result, and specifies the moving object as the subject. In other words, the subject specifying unit 330 can specify that the subject and the moving object are the same target by the evaluation of the relevance between them, and is capable of calculating an evaluation value indicating the relevance between them. The image analysis unit 320 and the subject specifying unit 330 are functional units that function as a processing unit that evaluates the relevance between the subject and the moving object based on the image data or photographing information and based on the log data.

The matching unit 340 matches an image of the subject included in the imaged data specified by the subject specifying unit 330 with a registered image of the user registered previously in the user information DB 350. When the image of the subject is matched, the matching unit 340 associates the user ID, which is associated with the subject, with the time of the image data and display area information (position information, size, or the like) displayed in the image data, and records it in the image DB 360. The matching unit 340, when recording the image data in the image DB 360, may notify the user of the user ID associated with the recorded image data that the image data is uploaded to the image management server 300 via the communication unit 310.

The user information DB 350 is a storage unit that stores information on the user using the image sharing system 1. The user information ID 350 stores moving object image data including a user ID uniquely assigned to the user who uses the image sharing system 1, face image data of the user, and possession image data of the user such as pet and automobile, which are associated with each other. The user's face image data or the user's possession image data stored in the user information DB 350 may be used for matching by the matching unit 340. A plurality of images are advantageously registered to increase the matching accuracy. The information of the user information DB 350 is information entered by the user when the user registers to use the image sharing system 1 as one example, and the registered information may be added and updated appropriately in response to a request from the user or the like.

The image DB 360 is a storage unit in which the image data including a subject matched by the matching unit 340 is stored in association with each other together with the time and display area information for each user ID. The image data stored in the image DB 360 is acquired by the image acquisition unit 370 and is provided for the corresponding user when a browsing request is received from the browsing terminal 400.

The image acquisition unit 370, when receiving a browsing request from the browsing terminal 400, extracts image data associated with the user ID of the user who gives the browsing request from the image DB 360 and transmits it to the browsing terminal 400. The image acquisition unit 370 may cause the image editor 380 to edit the image data extracted from the image DB 3620 and then transmit the result to the browsing terminal 400.

The image editor 380 edits and outputs the image data extracted from the image DB 360 by the image acquisition unit 370. The image editor 380 may segment a time range over which at least one of the user or the user's possession is included from the image data, and provide the user with only image data that is related to the user.

[2.4. Browsing Terminal]

The browsing terminal 400 is a terminal for browsing an image in which the user itself or the user's possession is photographed, which is received from the image management server 300. The browsing terminal 400 is configured to include an input unit 410, a request unit 420, a communication unit 430, a display processing unit 440, and a display unit 450, as illustrated in FIG. 2.

The input unit 410 is an operation unit for inputting various types of information used to operate the browsing terminal 400 by the user, and may be a touch panel, a keyboard, a button, or the like, as one example. The user uses the input unit 410 to perform an input of login information for receiving a service from the image sharing system 1, an operation input to transmit request information for requesting the image management server 300 to provide an image in which the user or the user's possession is photographed, a selection operation of display of the provided image, or the like.

The request unit 420, when receiving an operation input to transmit request information, generates the request information and transmits it to the image management server 300 via the communication unit 430. The request information is information that includes a user ID of the user who receives a service from the image sharing system 1. The request information may include a search key such as location and time for specifying an additionally provided image.

The communication unit 430 is a functional unit that transmits and receives information to and from a terminal or server connected thereto via a network. The communication unit 430 of the browsing terminal 400 transmits the request information inputted from the request unit 420 to the image management server 300. The communication unit receives image data provided from the image management server 300 based on the request information and outputs it to the display processing unit 440.

The display processing unit 440 causes the display unit 450 to display the image data provided from the image management server 300. When a plurality of image data is provided, the display processing unit 440 may create a thumbnail for each piece of image data and cause the display unit 450 to display an image data list in which thumbnails are arranged in an array. When one image data is provided from the image management server 300 or when one image data in the image data list is selected, the display processing unit 440 may cause the image data to be displayed at a large size that is suitable for a screen.

The display unit 450 is provided to display information, and may be a liquid crystal display or an organic EL display, as one example. The display unit 450 displays image data processed for display by the display processing unit 440.

One exemplary configuration of the image sharing system 1 according to the present embodiment has been described.

3. Processing Procedure

The processing procedure of the image sharing system 1 according to the present embodiment will be described with reference to FIGS. 10 to 17.
[3.1. Process During Photographing by Photographing Terminal]
(1) Image Data Acquisition Process The photographing terminal 100 acquires a still or moving image as image data by the image capture unit 110 as illustrated in FIG. 1. As illustrated in FIG. 3, the photographing information processing unit 120 adds metadata such as photographing location or time to the acquired image data, and the resultant image data is transmitted to the image management server 300 via the communication unit 130. The image data is transmitted to the image management server 300 at a predetermined timing and is accumulated therein.

In this regard, as illustrated in FIG. 5 or the like, the photographing terminal 100 may notify the surrounding persons of the photographer about the function state (photographing mode) of the image capture unit 110 (corresponding to the camera 15 in FIG. 5) from the viewpoint of protection for privacy of the user serving as a subject. As one example, it is possible to set a first mode (camera off mode), a second mode (sensor mode, or non-browsable mode), and a third mode (camera mode, or browsable mode) as the photographing mode. The switching between these photographing modes is performed based on a mode switching operation in the photographing terminal 100, and a recognition result, position information, attitude sensor information, and biometric sensor information of an image being photographed by the camera 15.
(2) Photographing Mode Notification Process (Photographer Side)

The photographing terminal 100 performs a display for notifying a person around the photographer about the photographing mode on the indicator 16 (see FIG. 4) or the display 17 (see FIG. 5) provided in the photographing terminal 100, depending on such switching between photographing modes. The photographing mode notification process is performed by a controller (not shown) of the photographing terminal 100 based on a determination process illustrated in FIG. 10, as one example. In other words, the controller of the photographing terminal 100 determines the setting of the photographing mode of the image capture unit 110 (S100), and performs a display control of the indicator 16 (see FIG. 4) or the display 17 (see FIG. 5) depending on each of the photographing modes (S110 to S130).

In the first mode (camera off mode), the indicator 16 or the display 17 is set to be in non-display state and no indication is set (S110). In the second mode (sensor mode, or non-browsable mode), the indicator 16 or the display 17 is effectuated as a display pattern of indication 1 that is previously set (S120). In the third mode (camera mode, or browsable mode), the indicator 16 or the display 17 is effectuated as a display pattern of indication 2 that is previously set (S130).

The display patterns of the indication 1 and the indication 2 may be different from each other. As one example, for the indicator 16 illustrated in FIG. 4, the first indicator 16*a* may emit light in the indication 1, and the second indicator 16*b* may emit light in the indication 2. As one example, for the display 17 illustrated in FIG. 5, "sensing only" may be displayed in the indication 1, and "recording" may be displayed in the indication 2.
(3) Photographing Mode Notification Process (Subject Side)

Figure 10:
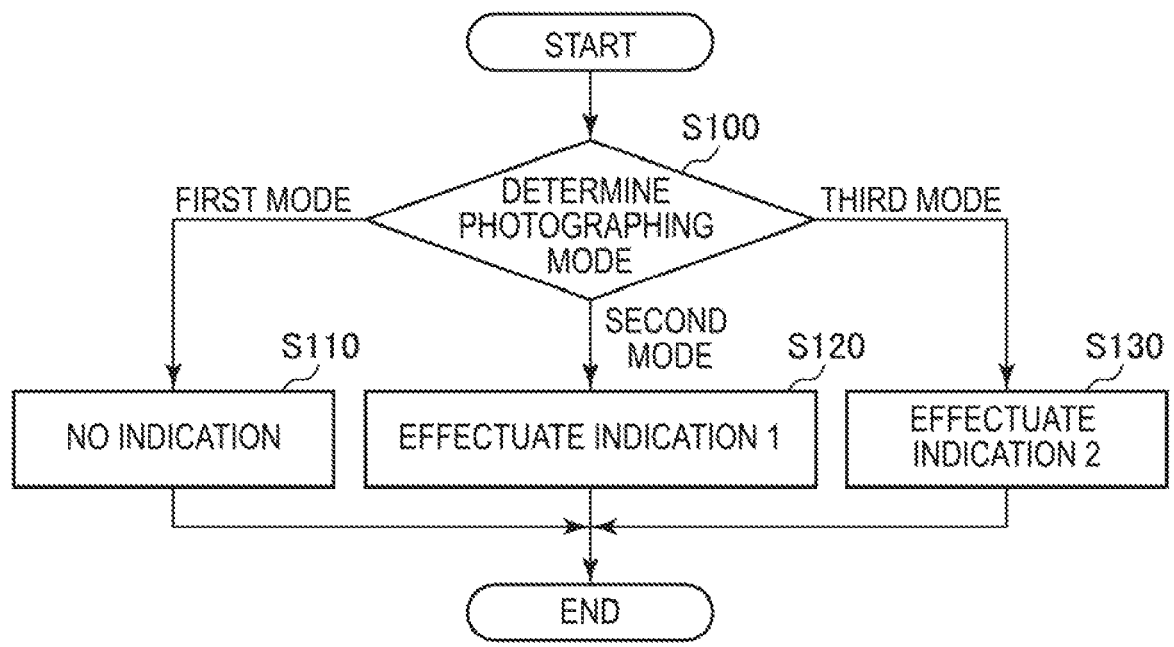
FIG. 10 is a flowchart illustrating a photographing mode notification process in the photographing terminal according to the present embodiment.

On the other hand, the process illustrated in FIG. 10 by the photographing terminal 100 makes it possible for a person around the photographing terminal 100 to view and recognize a display relating to the photographing mode displayed on the photographing terminal 100. However, it is difficult for a person around the photographing terminal 100 to perform typical activities while being concerned about the surrounding, and further it is conceivable that the person fails to recognize that the person itself become a target subject to be photographed. Thus, as one example, when a neighboring photographing terminal 100 is photographing in the third mode (camera mode, or browsable mode), a notification indicating this fact (referred to as "report information" hereinafter) may be received by a terminal that is carried by the user who can be a subject to be photographed. An example of the terminal receiving the report information includes a wearable terminal such as head-mounted display and a smartphone.

The report information is information that includes at least the position information of the photographing terminal 100 and further includes information such as photographing time information, photographing mode, and angle of view (zoom, or photographing direction). The photographing terminal 100 sends the report information to a terminal that is carried by the user located within a predetermined distance (e.g., within a radius of 10 meters) and notifies the terminal that the photographing terminal 100, which is in the photographing state, is located nearby. Alternatively, the report information may be sent only the user who is determined that the user is within the photographing range. The terminal receiving the report information presents the fact to the user.

Figure 11:
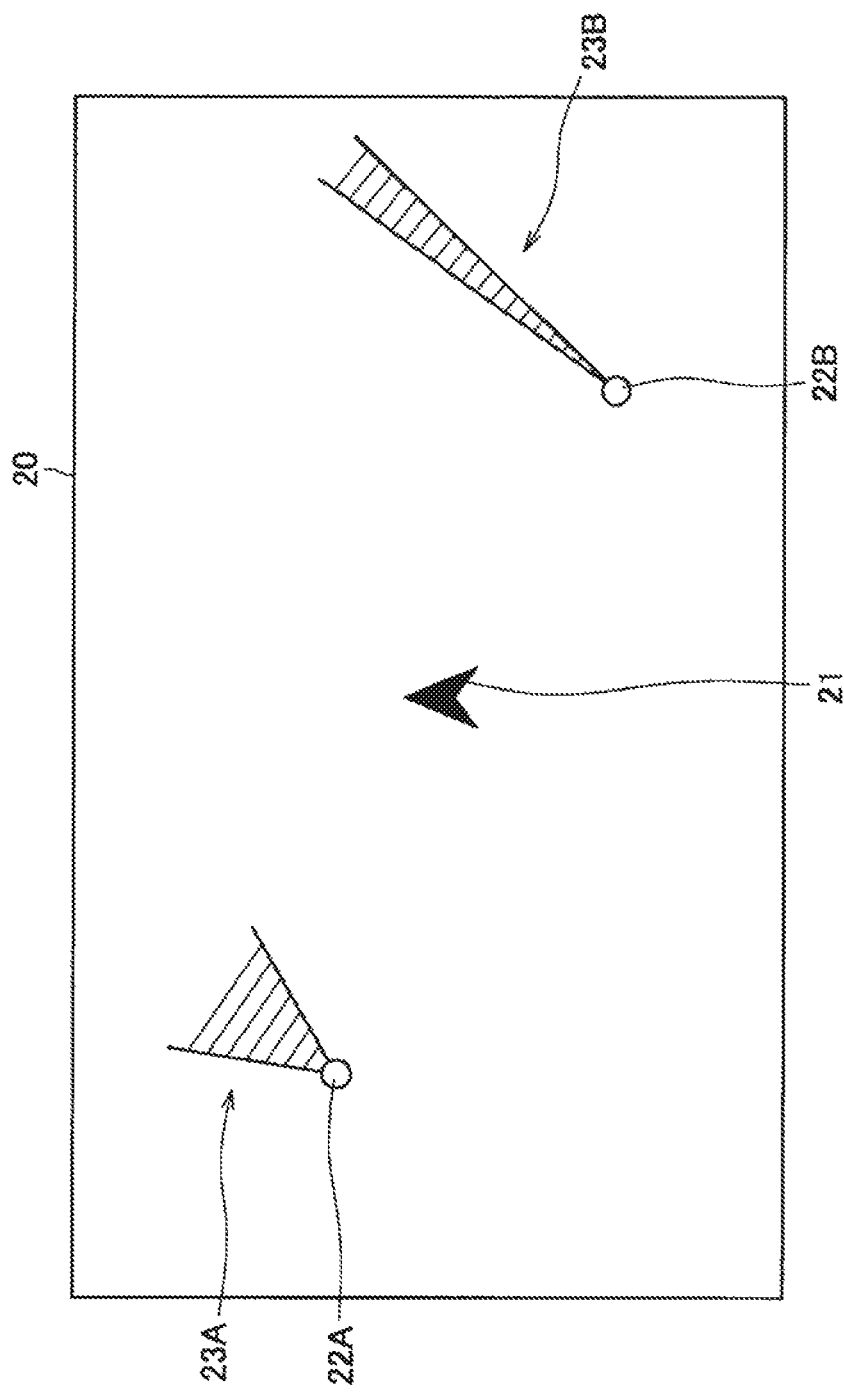
FIG. 11 is a diagram illustrated to describe an example of a report information notification screen of a terminal that receives report information.

The terminal receiving the report information displays the position or the like of the photographing terminal 100 that is in the photographing state on the display unit based on the report information, and notifies the user. As one example, FIG. 11 illustrates an exemplary report information notification screen 20 of the terminal that receives the report information. In the example illustrated in FIG. 11, the position of the user receiving the notification of the report information and the position of the photographing terminal 100 that is in the photographing state are illustrated. As one example, the position of the user receiving the notification of the report information is represented as a user object 21, and the position of the photographing terminal 100 is represented as a photographing terminal object 22 (22A and 22B). In the example of FIG. 11, the photographing terminal 100 that is in the photographing state exists on the front left side and the rear right side of the user.

Figure 12:
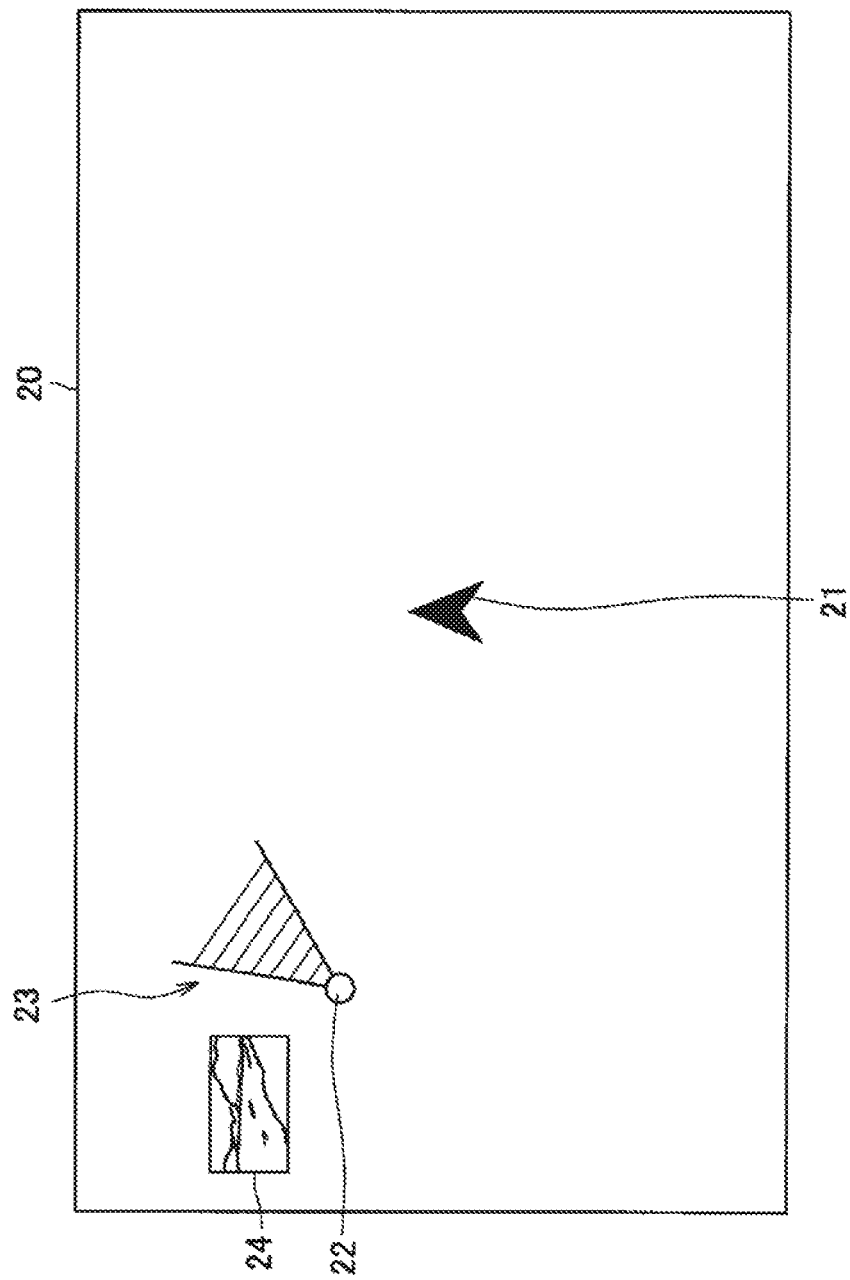
FIG. 12 is a diagram illustrated to describe another example of the report information notification screen of the terminal that receives report information.

As illustrated in FIG. 11, an angle-of-view object 23 (23A and 23B) representing the angle of view of each of the photographing terminal 100 is displayed together with the photographing terminal object 22 (22A and 22B). This makes it possible to recognize whether the user is within the photographing range of the photographing terminal 100. Alternatively, as illustrated in FIG. 12, image data 24 that is being photographed by the photographing terminal 100 (or photographed at its position) may be displayed together with the photographing terminal object 22 and the angle-of-view object 23. This makes it possible to recognize more accurately a target being photographed by the photographing terminal 100. An image photographed by the photographing terminal 100 is notified to the terminal carried by the person around the photographing terminal 100, which leads to the prevention of surreptitious photographing.

In this way, the information displayed on the report information notification screen 20 may be in non-display state when the photographing terminal 100 is no longer in the photographing state or after the elapse of a predetermined time from when the photographing is performed. In this case, the information displayed on the report information notification screen 20 may be in non-display state so that it becomes gradually thinner and then disappears with the lapse of time.

The report information notification screen 20 of FIGS. 11 and 12 displays only various types of objects, but the present disclosure is not limited thereto. As one example, a map may be displayed on the report information notification screen 20 and various types of objects may be displayed in their corresponding positions on the map. This makes it possible for the user to recognize more accurately the position of the photographing terminal 100 that is in the photographing state.

An image photographed by the photographing terminal 100 in the third mode (camera mode, or browsable mode) may be published on a mandatory basis. In other words, an image that is photographed most recently by the photographing terminal 100 may be capable of being checked by other terminals. Other persons can view the photographed image, and thus the surreptitious photographing can be likely to be prevented. The image management server 300 performs such provision of an image, as one example.

Figure 13:
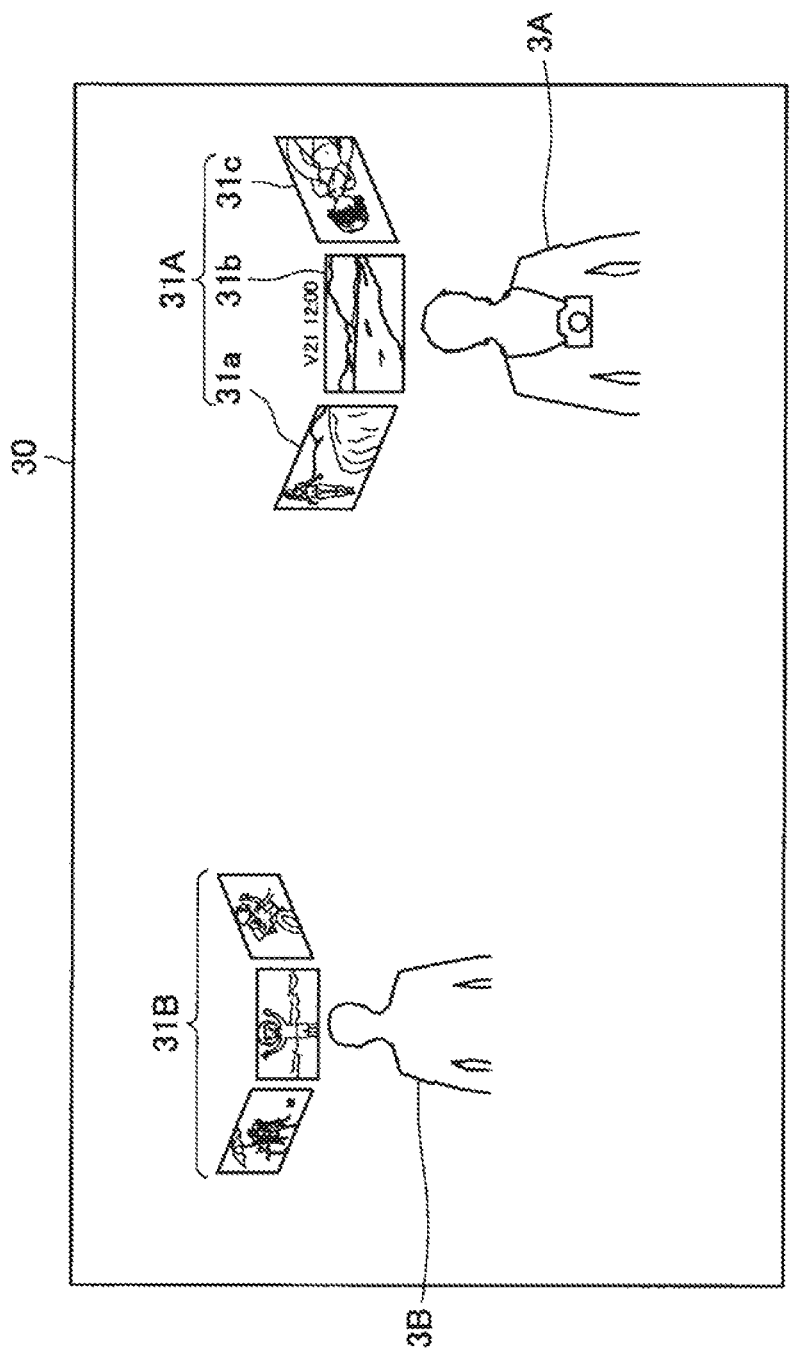
FIG. 13 is a diagram illustrated to describe an example of information viewed through a display unit when a user wearing a wearable terminal is performing activities.

As one example, FIG. 13 illustrates an example of information 30 viewed through a display unit when a user performs activities while wearing an eyewear terminal. In the information 30, persons 3A and 3B are persons who exist there. Images 31A and 31B photographed by the persons 3A and 3B, respectively, are displayed on the display unit. The images 31A and 31B are displayed over the head of the persons 3A and 3B, respectively, in the augmented reality (AR) view so that they are associated with the persons 3A and 3B, respectively.

As the images 31A and 31B, one or a plurality of images (e.g., three images 31a, 31b, and 31c) are displayed. The images 31A and 31B are not necessarily a full image, and only an image that is processed by a process such as blurring and mosaic may be displayed. The images 31A and 31B may be an image photographed during a predetermined time of most recent (e.g., ten minutes) by the persons 3A and 3B as one example, or may be an image photographed at the position closest to the current position. Alternatively, the images 31A and 31B may be displayed to be viewed by only a user of the log that it is within a predetermined range from the photographing position in a predetermined time before and after the photographing time, based on the photographing position and photographing time of the photographed image. This makes it possible to recognize the presence of the image data that is photographed as a subject without the user's notice. Such a display of the image can be prevented from being browsed by other users after the lapse of a predetermined time (e.g. after the lapse of 24 hours) from the photographing.

The process during the photographing by the photographing terminal 100 has been described.

[3.2. Log Data Generation Process by Log Collection Terminal]

The log collection terminal 200 is a terminal that is carried typically by the user who receives a service from the image sharing system 1. The log collection terminal 200 acquires information including the position and motion of the user at any time and continues to record it as a log in association with time information. The log collection terminal 200 is equipped with an authentication function, and the acquired information is used as information on activity of the authenticated user.

The log collection terminal 200 acquires the measurement data by the various sensors 210 including the acceleration sensor 212, the gyro sensor 214, the imager 216, and other like sensors, as illustrated in FIG. 9. The activity recognition unit 220 performs the activity recognition process based on the measurement data and thus the activity of the user is analyzed. As one example, the analyzed activity of the user, including walking, running, riding a bike, riding a train, eating, and being stopped, is outputted to the log data generator 230 as the activity recognition data together with the time at which the activity is performed. The log data generator 230 associates the user ID of the authenticated user with the activity recognition data that is log data and records it in the log DB 240. The stored user ID and log data are transmitted to the image management server 300 via the communication unit 250 at a predetermined timing.

[3.3. Subject Specifying Process by Image Management Server]

Figure 14:
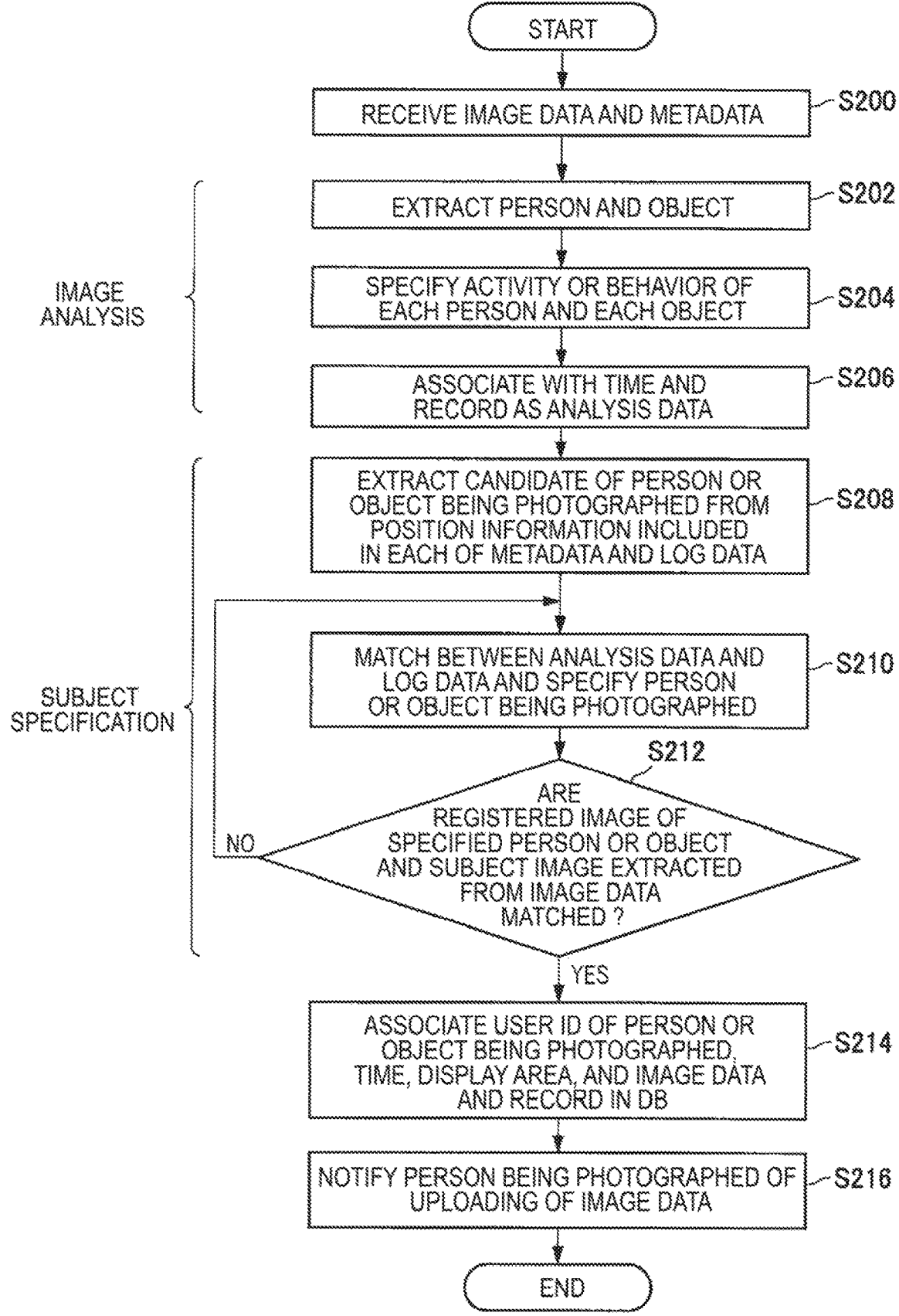
FIG. 14 is a flowchart illustrating a subject specifying process performed by an image management server according to the present embodiment.

The image management server 300 specifies a subject included in the image data photographed by the photographing terminal 100, based on the data transmitted from the photographing terminal 100 and the log collection terminal 200. FIG. 14 illustrates a subject specifying process performed by the image management server 300.

In the image management server 300, when the information acquisition unit 315 acquires the image data and metadata via the communication unit 310 (S200), the image analysis unit 320 performs image analysis for specifying a subject (S202 to S206).

The image analysis unit 320 extracts a moving object including a person and a moving object, such as pet or automobile, included in the image data as a subject (S202). The extraction of a subject can be performed using the face recognition technique or object recognition technique. Then, the image analysis unit 320 specifies the activity or behavior of each of the extracted subjects (S204). The activity or behavior of each of the subjects can be specified by analyzing an image of a subject included in the image data, or may be specified using metadata as necessary. When the activity or behavior of each subject is specified, it is associated with the time at which the activity or behavior is performed and is used as analysis data. The analysis data is associated with the analyzed image data and the metadata, and may be stored in a storage unit (not shown).

On the other hand, in the image management server 300, when the information acquisition unit 315 acquires the user ID and log data from the log collection terminal 200, the subject specifying unit 330 compares them with the analysis data obtained in step S206. The subject specifying unit 330 evaluates the relevance with the subject and concretely specifies a moving object that is consistent with the subject (S208 to S212). In the present embodiment, although the evaluation of the relevance between the subject and the moving object specifies that the object and the moving object are consistent with each other, the calculation of an evaluation value indicating the relevance between the subject and the moving object is included in the evaluation of the relevance between the subject and the moving object as a concept in the present technology.

The subject specifying unit 330 extracts a moving object candidate to be matched from the position information included in the metadata and log data, based on the metadata added to the image data and the log data (S208). A very large number of image data and log data may be provided, and in this case, it is possible to specify a subject efficiently by narrowing down the moving object candidates. In the present embodiment, it is considered that a moving object located near the position at which the image data is acquired is likely to be a subject, and thus moving objects that is likely to be a subject of the image data are narrowed down based on the position information for each piece of data.

Then, the subject specifying unit 330 contrasts between the activity or behavior of the analysis data and the log data, and specifies a moving object that matches the activity or behavior of the analysis data from the moving object candidates of the subject (S210). The subject specifying unit 330 performs the comparison with respect to the type of activities such as walking and running, the movement of body part (wrist, head, etc.) to which a sensor is attached, the audio or video of the user itself that is a moving object or the outside, the biological information, or the like. Then, the subject specifying unit 330 calculates the degree in which the subject of the image data and the moving object from which the log data is acquired are relevant to each other from a result obtained by the comparison. The subject specifying unit 330 may quantify the relevance between the subject and the moving object by representing it as the similarity degree using the probabilistic index such as percentage. The subject specifying unit 330 determines whether the subject and the moving object are consistent with each other based on a value of the probabilistic index. As one example, if the probabilistic index is greater than or equal to a predetermined value, the subject specifying unit 330 regards the moving object of the compared log data as consistent with the subject included in the image data.

Furthermore, the moving object specified by the subject specifying unit 330 is subject to image matching by the matching unit 340, and thus whether the moving object matches is determined (S212). The matching unit 340 matches an image of the subject included in the image data specified by the subject specifying unit 330 with a registered image of the moving object registered previously in the user information DB 350. This makes it possible to increase the recognition accuracy in which the moving object that is specified in step S210 is consistent with the subject by performing the facial identification. If they are not matched in step S212, it is determined that the moving object that is specified in step S210 is not a subject, and then the process of step S210 is performed again. The processes of steps S210 and S212 are repeated until the images match.

If the images match in step S212, then the matching unit 340 associates the user ID, which is associated with the registered image, with the time of image data and the display area information (position information, size, or the like) in which the moving object is displayed in the image data as a subject, and records it in the image DB 360 (S214).

Then, the matching unit 340 notifies the user of the user ID associated with the image data recorded in the image DB 360 that the image data in which the user or the moving object owned by the user is the subject is uploaded to the image management server 300 (S216).

The subject specifying process in the image management server 300 has been described. In the above description, although the extraction of a moving object candidate that is a subject using the position information (S208), the matching for the activity (S210), and the matching using the facial recognition (S212) are performed as the subject specifying process in that order, the present disclosure is not limited thereto. The order of these processes is not limited to a particular one. The matching process may be performed based on information other than the above.

The evaluation of whether the presented image is correct may be fed back from the user who receives the notification that the image data to be the subject is uploaded to the image management server 300 in step S216 or the user who gives a browsing request. The image management server 300, which receives the feedback of the evaluation, performs learning based on the evaluation, which leads to the improvement of the matching accuracy by incorporating the learned result to the processes of steps S208 to S212.

[3.4. Process of Providing Image for Browsing Terminal]

Figure 15:
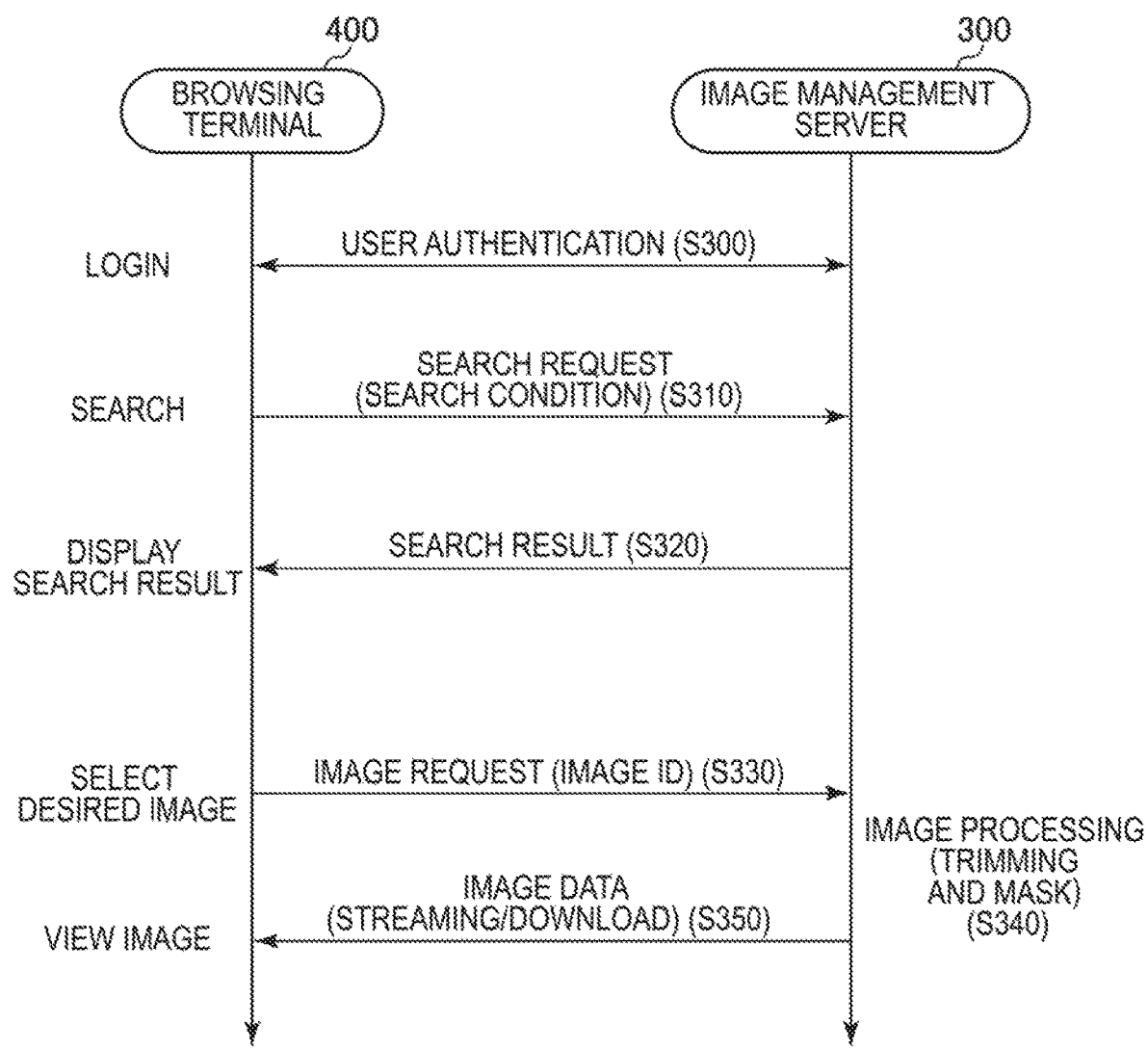
FIG. 15 is a flowchart illustrating an example of a process in which the image management server provides an image for a browsing terminal according to the present embodiment.
Figure 16:
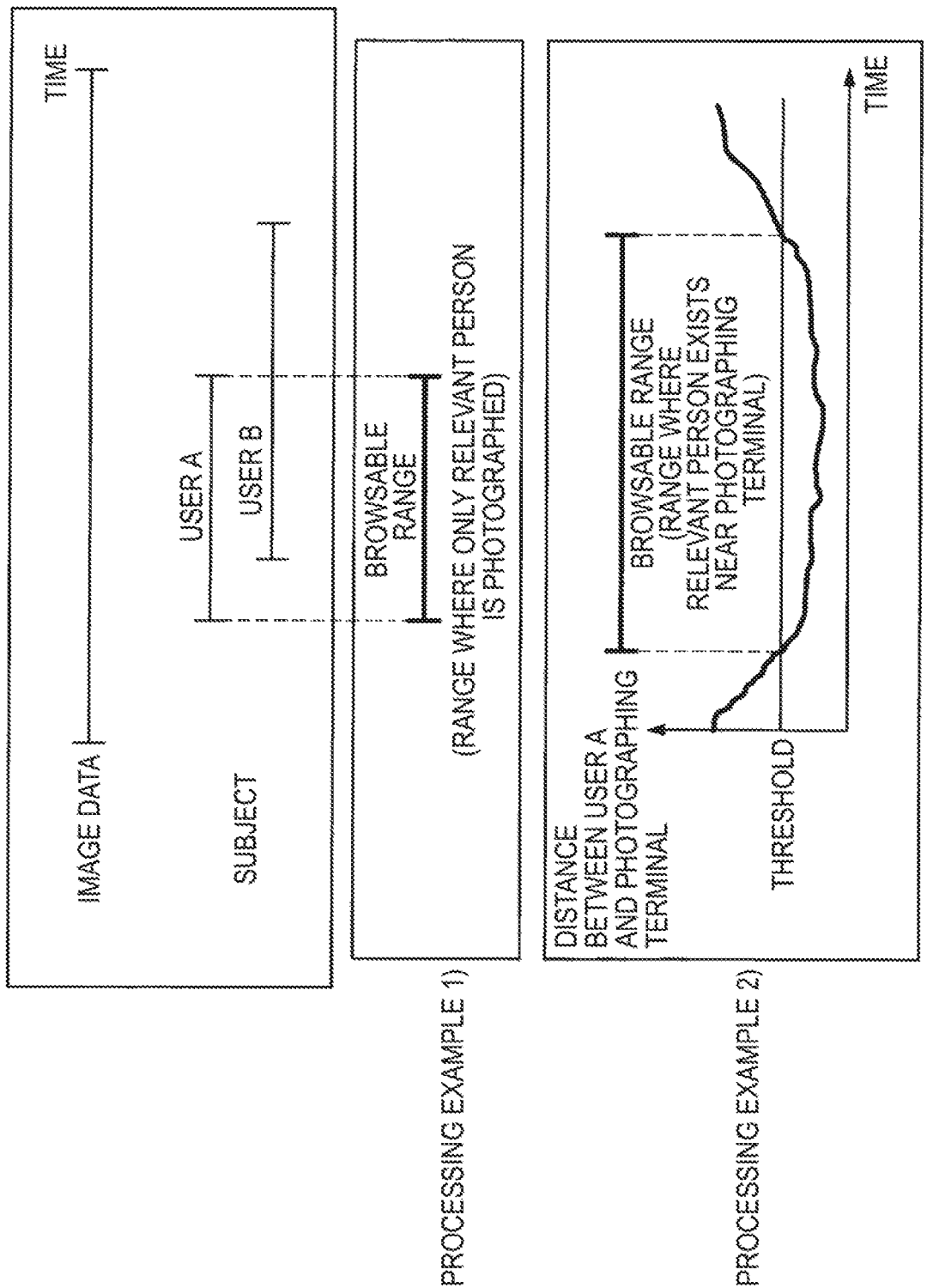
FIG. 16 is a diagram illustrated to describe an example of an image processing process by the image management server.

A process in which the image management server 300 provides an image for the browsing terminal 400 will be described with reference to FIGS. 15 and 16. FIG. 15 is a flowchart illustrating an example of a process in which the image management server 300 provides an image for the browsing terminal 400. FIG. 16 is a diagram illustrated to describe an example of an image processing process.

The user performs a login process for receiving a service from the image sharing system 1 using the browsing terminal 400 for browsing the image data when the image data to be a subject is uploaded to the image management server 300 or at an optional time. When the user inputs the login information to the image sharing system 1, the login information is transmitted to the image management server 300, and the user authentication is performed (S300). When the authentication is successfully performed, the image management server 300 can specify the user ID of the user who requests to receive a service from the image sharing system 1.

When the authentication is successfully performed, the user performs a search request to the image management server 300 through the browsing terminal 400 (S310). The search request contains at least the user ID of the user who sends a request. When the user want to receive the image data while specifying the duration, location, or the like in which the image data is acquired, a search key used to specify them is also transmitted to the image management server 300. The image acquisition unit 370 of the image management server 300 that receives the search request acquires the corresponding image data from the image DB 360 based on the information contained in the search request, and transmits it to the browsing terminal 400 (S320).

The browsing terminal 400, when receiving a result obtained from the search request, presents the received image data to the user. If only one piece of image data is received, the display processing unit 440 may cause the display unit 450 to display the image data without any modification. On the other hand, when a plurality pieces of image data are received, the display processing unit 440 may create thumbnail for each piece of image data and may cause the display unit 450 to display it as an image data list. Alternatively, the side of the image management server 300 may transmit only the thumbnail for each piece of image data to the browsing terminal 400. In this case, the user selects image data to be browsed from the image data list, and transmits it as the image request to the image management server 300 (S330). The image request contains an image ID for specifying the selected image data.

The image management server 300, when receiving the image request, causes the image editor 380 to process the image data as necessary (S340). When the selected image data is a still image, the image editor 380 performs processing of trimming only a range in which only a moving object serving as the user or the user's possession is photographed or masking a person or the like other than the moving object, while protecting the privacy of other users. When the selected image data is a moving image, similarly, the image editor 380 may trim only a range in which the moving object is photographed or the time range, or mask other users.

FIG. 16 illustrates an example of processing a moving image in a case where a plurality of persons are photographed. In the example illustrated in FIG. 16, a user A and a user B are photographed as a subject in the moving image having a predetermined reproduction time. In this case, the user A is assumed to give a browsing request. The image editor 380 may trim the image data to be the time zone in which only the user A is photographed and may transmit it to the browsing terminal 400 of the user A, as shown in processing example 1. Alternatively, the image editor 380 may trim the image data so that only the time zone in which the user A exists in a distance (threshold) from the browsing terminal 400 is presented and may transmit it to the browsing terminal 400 of the user A, as shown in processing example 2.

In this case, when there is the time zone in which the user B is photographed in the image together with the user A, the image editor 380 may mask the user B, or may allow the user B to cancel the masking after obtaining the permission to make public from the user A. In a case where the permission to make public is requested from other users, if the number of persons other than the user who requests browsing is large, it is not practical to ask for permission to make public from all the persons. In this case, as one example, it may be possible to ask for permission to make public only from a person having the length of the time at which the person is photographed in the image data, the display size, or the like, which is larger than or equal to a predetermined size.

The image DB 360 records the user ID of a subject included in the image data in association with the video data together with the photographing time and a display area in the image data to perform such image processing.

The image data whose image is processed by the image editor 380 is transmitted to the browsing terminal 400 via the communication unit 310 in streaming format or is downloaded to the browsing terminal 400 (S350). Thus, the user can browse the transmitted image data through the browsing terminal 400.

The process in which the image management server 300 provides an image for the browsing terminal 400 has been described.

4. Conclusion

The configuration and processing of the image sharing system 1 according to the present embodiment have been described. The process procedure of the image sharing system 1 according to the present embodiment as described above allows the user to browse or acquire the image data photographed by others. in the above description, the image data, which is photographed by the photographing terminal 100 and is uploaded to the image management server 300, can be browsed by the user that is a subject being photographed in the image data. In this case, the photographer itself may be prevented from browsing depending on the photographing mode when the image data is acquired for the privacy protection of the user that is a subject.

As one example, when the photographing mode of the photographing terminal 100 is the third mode (camera mode, or browsable mode), it is conceivable that the photographer photographs without obtaining the permission from the person that is a subject. Thus, the image data acquired in the third mode may be encrypted, and the image management server 300 may manage so that the photographer is prevented from browsing. In this way, when the image data is encrypted, the image data of the photographing terminal 100 may be deleted after the image data is uploaded to the image management server 300.

5. Modification

Figure 17:
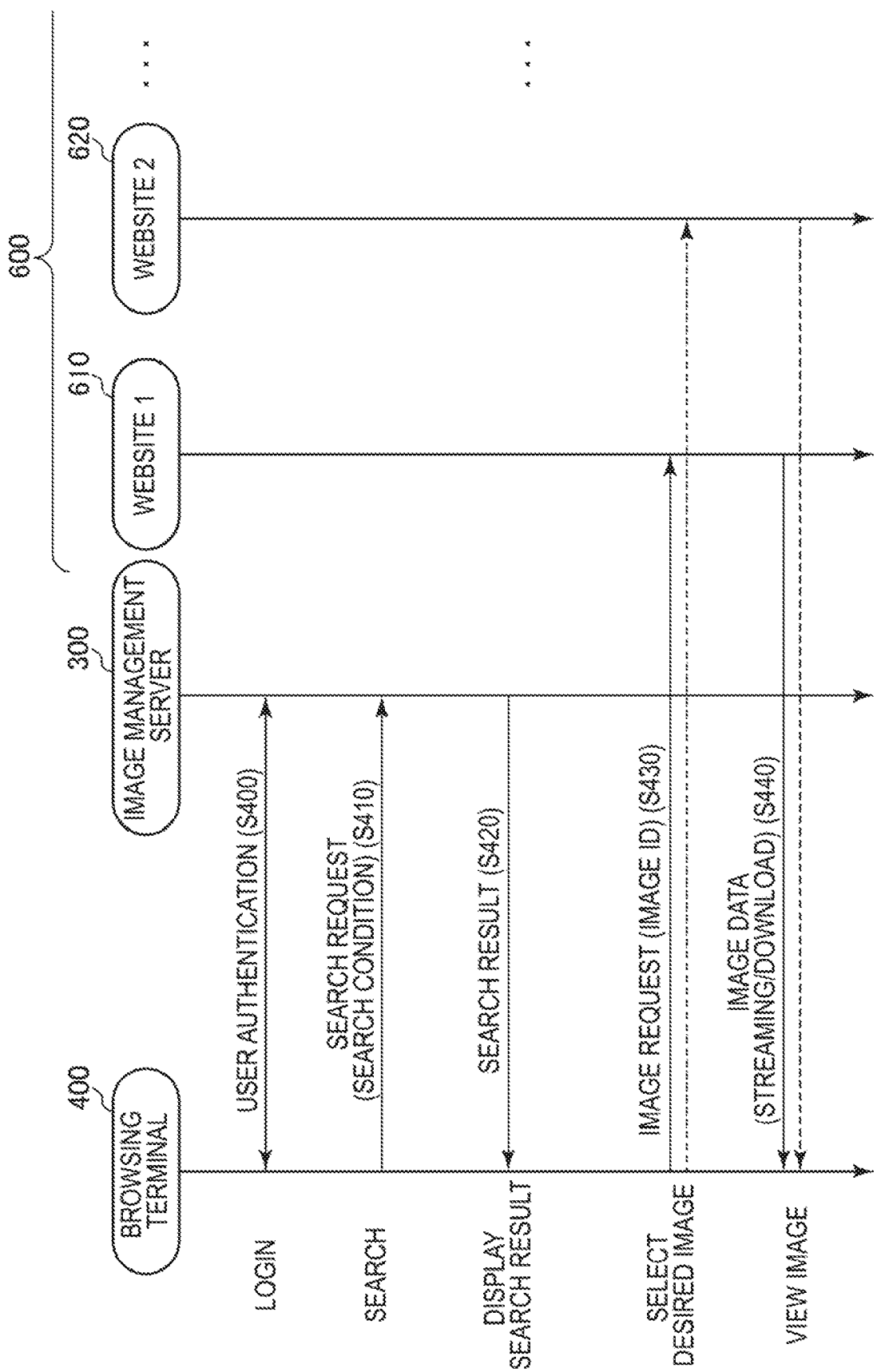
FIG. 17 is a flowchart illustrating an exemplary process of providing the image data published on the Web by the image management server for the browsing terminal.

In FIG. 15, the example of presenting the image data managed in the image management server 300 that constitutes the image sharing system 1 depending on the browsing request from the browsing terminal 400 has been described. However, as a service of the image sharing system 1, not only the image data managed in the image management server 300 but also the image data published on the Web may be similarly managed. In most cases, the image data published on the Web is associated with metadata such as position information. This makes it possible for the image management server 300 to manage the image data published on the Web. The process performed in this case will be described based on FIG. 17. FIG. 17 is a flowchart illustrating an exemplary process of providing the image data published on the Web by the image management server 300 for the browsing terminal 400.

As illustrated in FIG. 17, the user performs a login process for receiving a service from the image sharing system 1 using the browsing terminal 400 for browsing the image data. When the user inputs login information to the image sharing system 1, the login information is transmitted to the image management server 300 and the user authentication is performed therein (S400). The authentication performed successfully allows the image management server 300 to specify the user ID of the user who is requesting to receive a service from the image sharing system 1.

When the authentication is successfully performed, the user performs a search request to the image management server 300 through the browsing terminal 400 (S410). The search request contains at least the user ID of the user who sends a request. When the user want to receive the image data while specifying the duration, location, or the like in which the image data is acquired, a search key used to specify them is also transmitted to the image management server 300. At this time, the user transmits the fact that the image data published on the Web other than the image data held by the image management server 300 itself is to be searched.

The image management server 300 manages image data to be uploaded on websites 610, 620, and so on. As one example, when the image data is uploaded to the website of a target to be managed, the image management server 300 performs image analysis on the image data and specifies the user included in a subject. This process may be performed according to the process illustrated in FIG. 14, as one example. The image management server 300 associates an image ID that specifies the image data on the website, a thumbnail of the image, a name of website that holds the image data, and a user ID included as a subject with each other, treats them as a website management information, and stores them in a storage unit (not shown).

The image acquisition unit 370 of the image management server 300, when receiving the search request, transmits a thumbnail of the corresponding image data obtained by referring to the website management information to the browsing terminal 400 based on the information included in the search request (S420).

The browsing terminal 400, when receiving a result obtained by the search request, presents the thumbnail and the website name of the received image data to the user. The user selects the thumbnail and the website name of the image data to be browsed from the presented thumbnail, treats them as the image request, and transmits it to each of the websites 610, 620, and so on (S430). The image request contains an image ID used to specify the selected image data.

Each of the websites 610, 620, and so on, when receiving the image request, transmits the image data to the browsing terminal 400 in streaming format or downloads it to the browsing terminal 400 (S440). Thus, it is possible for the user to browse the transmitted image data through the browsing terminal 400. In this way, the image management server 300 can manage the image data on the website.

6. Hardware Configuration Example

Figure 18:
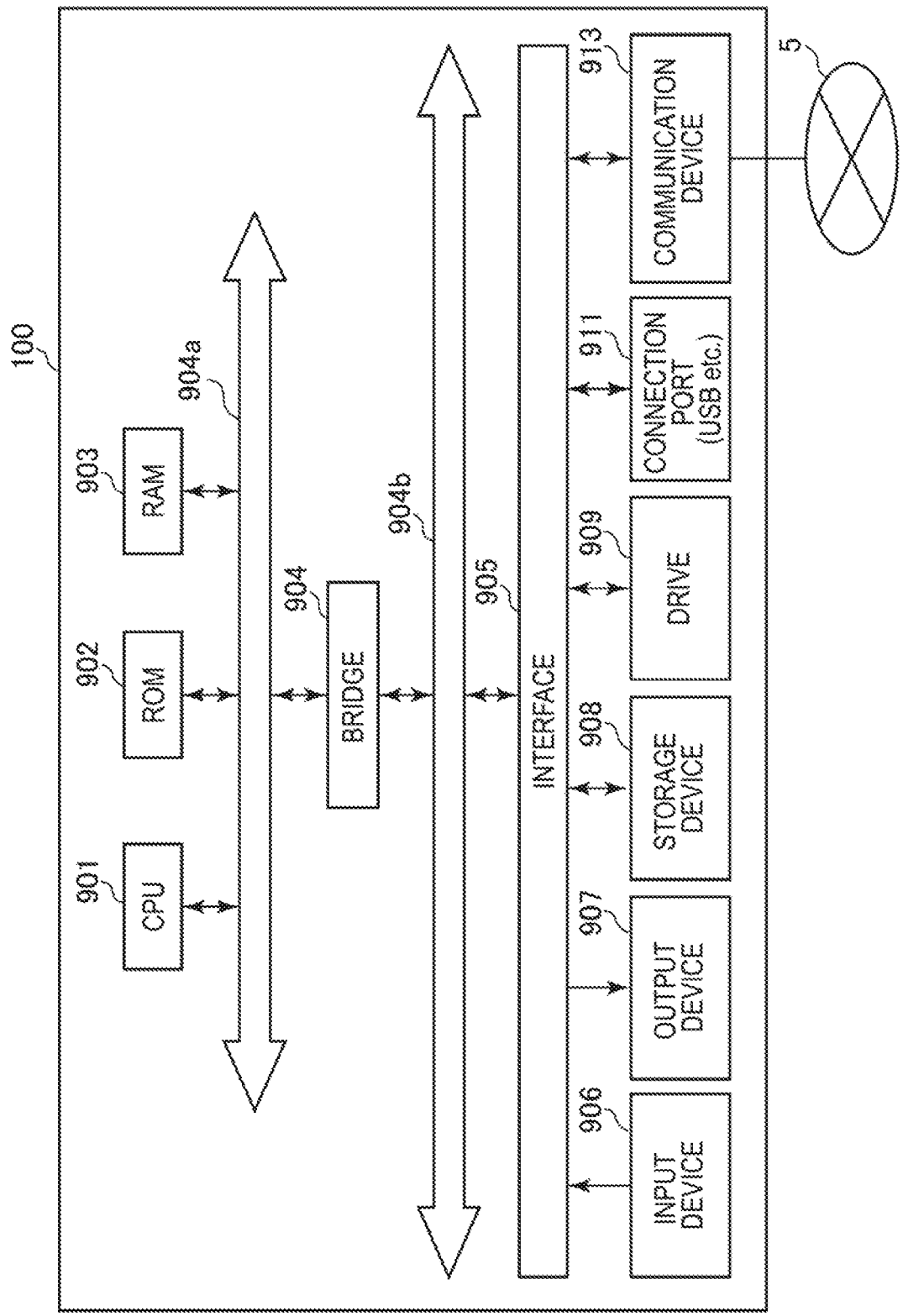
FIG. 18 is a hardware block diagram illustrating an exemplary hardware configuration of the photographing terminal according to the present embodiment.

Finally, an exemplary hardware configuration of the photographing terminal 100, the log collection terminal 200, the image management server 300, and the browsing terminal 400 according to the present embodiment will be described. These devices can have a similar configuration, and thus the description will be given of the photographing terminal 100 as an example. FIG. 18 is a hardware block diagram illustrating an exemplary hardware configuration of the photographing terminal 100 according to the present embodiment.

As described above, the photographing terminal 100 according to the embodiments can be implemented as a processing device such as a computer. As illustrated in FIG. 18, the photographing terminal 100 includes a central processing unit (CPU) 901, read only memory (ROM) 902, random access memory (RAM) 903, and a host bus 904a.

Furthermore, the photographing terminal 100 includes a bridge 904, an external bus 904b, an interface 905, an input device 906, an output device 907, a storage device 908, a drive 909, a connection port 911, and a communication device 913.

The CPU 901 functions as an arithmetic processing unit and a controller, and controls the overall operation in the photographing terminal 100 according to various programs. Furthermore, the CPU 901 may be a microprocessor. The ROM 902 stores programs, operation parameters, and the like that the CPU 901 uses. The RAM 903 temporarily stores programs used in the execution of the CPU 901 and the parameters and the like that appropriately changes during the execution. The above are interconnected via a host bus 904a constituted by a CPU bus.

The host bus 904a is connected to the external bus 904b, such as a peripheral component interconnect/interface (PCI) bus, through the bridge 904. Note that the host bus 904a, the bridge 904, and the external bus 904b are not necessarily configured as separate components but the functions thereof may be implemented in a single bus.

The input device 906 includes input devices for the user to input information, such as a mouse, a keyboard, a touch panel, a button, a microphone, a switch, and a lever, and an input control circuit that generates an input signal on the basis of the input performed by the user and that outputs the input signal to the CPU 901. The output device 907 includes, for example, a display device, such as a liquid crystal display (LCD) device, an organic light emitting diode (OLED) device, or a lamp, and speech output device, such as a speaker.

The storage device 908 is an example of the storage unit of the photographing terminal 100 and is a device for storing data. The storage device 908 may include a recording medium, a recording device that records data in the recording medium, a readout device that reads out data from the recording medium, and a deletion device that deletes data recoded in the recording medium. The storage device 908 drives the hard disk and stores therein programs that the CPU 901 executes and various kinds of data.

The drive 909 is a reader/writer for a recording medium and is built-in the photographing terminal 100 or is externally attached. The driver 909 reads out information recorded in a magnetic disk, an optical disk, or a magneto-optical disc that is mounted thereto or a removable storage medium such as a semiconductor memory and outputs the information to the RAM 903.

The connection port 911 is an interface connected to an external device and is a port for connecting an external device that is capable of data transmission through, for example, a universal serial bus (USB). Furthermore, the communication device 913 is a communication interface constituted by, for example, a communication device or the like for connecting to a communication network. Furthermore, the communication device 913 may be a communication device corresponding to a local area network (LAN), a communication device corresponding to a wireless USB, or a wired communication device that communicates through wire.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

As one example, in the viewpoint of the prevention of surreptitious photographing, the determination of whether the transition of photographing mode is possible depending on the permission from the surrounding persons may be performed with respect to the photographing mode of the photographing terminal 100. As one example, a terminal carried by a person around the photographing terminal 100 sends a signal used to notify approval or disapproval of photographing, and the signal is capable of being received by the photographing terminal 100. In this case, the photographing terminal 100, when receiving a photographing NG signal from the terminal carried by a neighboring person, disables the transition to the camera mode. Alternatively, the photographing terminal 100 may be prevented from performing the transition to the camera mode until it receives a photographing OK signal from the terminal carried by a neighboring person.

Such management of the photographing mode by the photographing terminal 100 may be performed, as one example, by the image management server 300 of the image sharing system 1. The photographing allowable range of the photographing terminal 100 may be defined previously by setting parameters such as the direction and angle of view (angle) of a camera. In this case, position information may be included in the photographing NG signal or the photographing OK signal sent from the terminal carried by a neighboring person, and thus the photographing may be disabled when a person who sends the photographing NG signal is in the photographing allowable range.

An indication of photographing permission may be checked from the face of the person detected by the camera 15. An example of the indication of photographing permission includes a speech or gesture of "OK", recognition of a screen in which the user is registered, and smiling-face recognition. This allows the photographing terminal 100 as one example to permit the transition to the camera mode only if the indication of photographing permission can be checked. Otherwise, the transition to the camera mode may be disabled, or the protection measures may be used so that the photographer may be prevented from browsing the photographed full image. In addition to the disabling of photographing or the protection measures, it is possible for the photographer to be prevented from browsing freely the image data by deleting the acquired image data or by filtering a subject using image processing technique such as mosaic, blurring, decrease in image quality so that the subject is failed to be discriminated.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An information processing device including:

a photographing-related information acquisition unit configured to acquire image data obtained by photographing a subject or photographing information associated with the image data;

a log data acquisition unit configured to acquire log data serving as information related to an operation of a predetermined moving object; and a processing unit configured to evaluate a relevance between the subject and the moving object based on the image data or the photographing information and based on the log data.

(2)

The information processing device according to (1), wherein the photographing information includes position information related to a position where photographing for generating the image data is performed, and the processing unit evaluates the relevance between the subject and the moving object based on the position information and position information included in the log data.

(3)

The information processing device according to (1) or (2), wherein the processing unit compares information on activity of the subject with the log data and evaluates the relevance between the subject and the moving object, the information on activity being obtained by analyzing the image data.

(4)

The information processing device according to (3), wherein the information on activity of the subject obtained by analyzing the image data is associated with information on time at which the activity is performed.

(5)

The information processing device according to any one of (1) to (4), wherein the information processing device further includes a matching unit configured to match between an image of the subject based on the image data and a registered image of a subject being registered previously, and evaluates the relevance between the subject and the moving object.

(6)

The information processing device according to one of (1) to (5), including:

a notification unit configured to give a notification to a moving object itself evaluated by the processing unit as having a high relevance with the subject or to a terminal of a user who is an owner of the moving object.

(7)

The information processing device according to one of (1) to (6), wherein the image data is image data being published on a Web.

(8)

The information processing device according to one of (1) to (7), further including:

an image acquisition unit configured to receive a request for browsing image data from a user and to acquire image data in which a moving object serving as the user itself or a possession of the user is included as a subject.

(9)

The information processing device according to (8), further including:

an image editor configured to process image data in which a moving object serving as a user itself giving a request for browsing or a possession of the user is included as a subject into image data including at least the moving object.

(10)

The information processing device according to (8) or (9), wherein the photographing information of the image data includes a photographing mode being set depending on a use of an image to be acquired, and the image data, when the photographing mode is a mode for image recording, is allowed to be browsed by only a moving object itself included in the image data as a subject or a user serving as an owner of the moving object.

(11)

A photographing device including:

an image capture unit;

a photographing information acquisition unit configured to acquire photographing information associated with image data acquired by the image capture unit; and a communication unit configured to transmit at least one of the image data and the photographing information to an information processing device configured to evaluate a relevance between a subject included in the image data and a moving object from which log data serving as information relating to an operation is acquired.

(12)

The photographing device according to (11), wherein the photographing information includes a photographing mode being set depending on a use of an image to be acquired.

(13)

The photographing device according to (12), further including:

a notification unit configured to give a notification of the photographing mode to be visually recognizable by a person around the photographing device.

(14)

An image sharing system including:

a log collection device configured to acquire log data serving as information on activity of a moving object and to transmit the log data to an information processing device configured to evaluate a relevance between a subject included in image data and the moving object; and a browsing device configured to transmit a request for browsing image data in which a moving object serving as a user itself or a possession of the user is included as a subject to the information processing device and to acquire requested image data, wherein the browsing device acquires image data having a high relevance between the subject and the moving object from the information processing device.

(15)

A method of information processing, the method including:

acquiring image data obtained by photographing a subject or photographing information associated with the image data;

acquiring log data serving as information related to an operation of a predetermined moving object; and evaluating a relevance between the subject and the moving object based on the image data or the photographing information and based on the log data.

(16)

A program for causing a computer to function as an information processing device including:

a photographing-related information acquisition unit configured to acquire image data obtained by photographing a subject or photographing information associated with the image data;

a log data acquisition unit configured to acquire log data serving as information related to an operation of a predetermined moving object; and a processing unit configured to evaluate a relevance between the subject and the moving object based on the image data or the photographing information and based on the log data.

(17)

The photographing device according to (13), wherein the notification unit gives a notification of the photographing mode during a predetermined time before the present time.

(18)

The photographing device according to any one of (11) to (13), wherein the communication unit gives a notification indicating a mode for image recording to a terminal carried by a person around the photographing device.

(19)

The photographing device according to (18), wherein the communication unit causes a terminal carried by a person around the photographing device to display an image photographed near a position at which the person around the photographing device exists.

REFERENCE SIGNS LIST 1 image sharing system
10 eyewear terminal
16, 18 indicator
17 display
100 photographing terminal
110 image capture unit
120 photographing information processing unit
130 communication unit
200 log collection terminal
210 various sensors
220 activity recognition unit
230 log data generator
240 log DB
250 communication unit
300 image management server
310 communication unit
320 image analysis unit
330 subject specifying unit
340 matching unit
350 user information DB
360 image DB
370 image acquisition unit
380 image editor
400 browsing terminal
410 input unit
420 request unit
430 communication unit
440 display processing unit
450 display unit

The invention claimed is:

1. An information processing device, comprising:

circuitry configured to:

acquire, from an image capture device, image data of a subject that is captured by the image capture device;

acquire, from a motion sensor, log data of a moving object, wherein the log data corresponds to an operation of the moving object;

analyze the image data of the subject to obtain activity information of the subject, wherein the activity information of the subject corresponds to an activity of the subject;

determine a relevance between the subject and the moving object based on the log data and the image data by comparing the activity information of the subject with the log data of the moving object;

determine, based on the relevance, the subject in the image data is the same as the moving object; and transmit the image data based on a user request and the determination that the subject in the image data is the same as the moving object.

2. The information processing device according to claim 1, wherein
the image data includes first position information,
the log data includes second position information,
each of the first position information and the second position information is based on a location where the image capture device captures the image data of the subject, and
the circuitry is further configured to determine the relevance between the subject and the moving object based on the first position information and the second position information.

3. The information processing device according to claim 1, wherein the activity information is associated with a time of the activity.

4. The information processing device according to claim 1, wherein the circuitry is further configured to:
compare the image data of the subject and a registered image of a registered subject; and
determine the relevance between the subject and the moving object based on the comparison between the image data and the registered image.

5. The information processing device according to claim 1, wherein the circuitry is further configured to output a notification to one of the moving object or a user terminal associated with the moving object.

6. The information processing device according to claim 1, wherein the image data is published on a Web.

7. The information processing device according to claim 1, wherein
the circuitry is further configured to receive, from an external device, the user request to browse the image data, and
the moving object is one of a user of the external device or an object possessed by the user of the external device.

8. The information processing device according to claim 7, wherein
the image data includes a photographing mode,
the photographing mode is based on a use of the captured image data,
the photographing mode is a mode for image recording, and
the circuitry is further configured to transmit the image data in which the moving object is included as the subject, based on the photographing mode.

9. A photographing device, comprising:
an image capture device configured to capture image data of a subject; and
circuitry configured to:
acquire, from the image capture device, the image data; and
transmit the image data to an information processing device,
wherein the information processing device:
acquires, from a motion sensor, log data of a moving object, wherein the log data corresponds to an operation of the moving object,
analyze the image data of the subject to obtain activity information of the subject, wherein the activity information of the subject corresponds to an activity of the subject,
determines a relevance between the subject and the moving object based on log data and the image data by comparing the activity information of the subject with the log data of the moving object,
determines, based on the relevance, the subject in the image data is the same as the moving object, and
transmits the image data based on a user request and the determination that the subject in the image data is the same as the moving object.

10. The photographing device according to claim 9, wherein
the image data includes a photographing mode, and
the photographing mode is based on a use of the captured image data.

11. The photographing device according to claim 10, wherein the circuitry is further configured to output a visually recognizable notification of the photographing mode.

12. An image sharing system, comprising:
an information processing device;
a log collection device configured to:
acquire, from a motion sensor, log data of a moving object, wherein the log data corresponds to an activity of the moving object; and
transmit the log data to the information processing device,
wherein the information processing device is configured to:
analyze image data of a subject to obtain activity information of the subject, wherein the activity information of the subject corresponds to an activity of the subject;
determine a relevance between the subject in the image data and the moving object based on the log data and the image data by comparing the activity information of the subject with the log data of the moving object;
determine, based on the relevance, the subject in the image data is the same as the moving object; and
transmit the image data based on a user request and the determination that the subject in the image data is the same as the moving object; and
a browsing device configured to:
transmit the user request to browse the image data in which the subject is the same as the moving object, wherein the moving object is one of a user or an object associated with the user; and
receive, from the information processing device, the image data based on the transmitted user request.

13. A method of information processing, the method comprising:
acquiring image data of a subject that is captured by an image capture device;
acquiring, from a motion sensor, log data of a moving object, wherein the log data corresponds to an operation of the moving object;
analyzing the image data of the subject to obtain activity information of the subject, wherein the activity information of the subject corresponds to an activity of the subject;
determining a relevance between the subject and the moving object based on the log data the image data by comparing the activity information of the subject with the log data of the moving object;
determining, based on the relevance, the subject in the image data is the same as the determined moving object; and transmitting the image data based on a user request and the determination that the subject in the image data is the same as the moving object.

14. A non-transitory computer-readable medium having stored thereon computer-executable instructions that, when executed by a processor, cause the processor to execute operations, the operations comprising:

acquiring image data of a subject that is captured by an image capture device;

acquiring, from a motion sensor, log data of a moving object, wherein the log data corresponds to an operation of the moving object;

analyzing the image data of the subject to obtain activity information of the subject, wherein the activity information of the subject corresponds to an activity of the subject;

determining a relevance between the subject and the moving object based on the log data and the image data by comparing the activity information of the subject with the log data of the moving object;

determining, based on the relevance, the subject in the image data is the same as the moving object; and transmitting the image data based on a user request and the determination that the subject in the image data is the same as the moving object.

* * * * *